United States Patent
Kim

(10) Patent No.: US 12,249,330 B2
(45) Date of Patent: Mar. 11, 2025

(54) ELECTRONIC DEVICE AND METHOD OF PROVIDING CONNECTION SWITCHING FOR WIRELESS AUDIO DEVICE

(71) Applicant: Samsung Electronics Co., Ltd., Suwon-si (KR)

(72) Inventor: Hyeonjeong Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 286 days.

(21) Appl. No.: 17/889,768

(22) Filed: Aug. 17, 2022

(65) Prior Publication Data

US 2023/0031966 A1 Feb. 2, 2023

Related U.S. Application Data

(63) Continuation of application No. PCT/KR2022/007534, filed on May 27, 2022.

(51) Int. Cl.
*G10L 15/22* (2006.01)
*G10L 15/26* (2006.01)

(52) U.S. Cl.
CPC ............ *G10L 15/22* (2013.01); *G10L 15/26* (2013.01); *G10L 2015/223* (2013.01); *H04R 2420/01* (2013.01); *H04R 2420/07* (2013.01)

(58) Field of Classification Search
None
See application file for complete search history.

(56) References Cited

U.S. PATENT DOCUMENTS

| | | | |
|---|---|---|---|
| 10,832,653 B1 | 11/2020 | Hart et al. | |
| 2019/0066670 A1* | 2/2019 | White | G10L 15/22 |
| 2020/0082826 A1* | 3/2020 | Geldbach | G10L 15/08 |
| 2021/0005202 A1 | 1/2021 | Mixter et al. | |
| 2022/0295581 A1* | 9/2022 | Batta | H04W 8/005 |

FOREIGN PATENT DOCUMENTS

| | | |
|---|---|---|
| CN | 109348338 A | 2/2019 |
| CN | 112492442 A | 3/2021 |
| JP | 2004-120652 A | 4/2004 |
| KR | 10-1307456 B1 | 9/2013 |
| KR | 10-1433166 B1 | 8/2014 |
| KR | 10-2015-0050883 A | 5/2015 |
| KR | 10-2015-0095124 A | 8/2015 |
| KR | 10-2017-0011763 A | 2/2017 |
| KR | 10-2020-0127814 A | 11/2020 |

OTHER PUBLICATIONS

International Search Report dated Aug. 22, 2022, issued in International Patent Application No. PCT/KR2022/007534.

* cited by examiner

*Primary Examiner* — Nicole A K Schmieder
(74) *Attorney, Agent, or Firm* — Jefferson IP Law, LLP

(57) ABSTRACT

An electronic device is provided. The electronic device includes a processor and a memory storing instructions which, when executed by the processor, cause the processor to obtain information of a wireless audio device wirelessly connectable to the electronic device, determine whether an utterance of a user is a device-controlling utterance for a target device which is a target of remote control in response to the information of the wireless audio device, and suggest switching a connection of the wireless audio device to the target device based on an intent in the utterance of the user. Other example embodiments, in addition to the foregoing example embodiment, are also applicable.

14 Claims, 15 Drawing Sheets

ELECTRONIC DEVICE AND METHOD OF PROVIDING CONNECTION SWITCHING FOR WIRELESS AUDIO DEVICE

CROSS-REFERENCE TO RELATED APPLICATION(S)

This application is a continuation application, claiming priority under § 365(c), of an International application No. PCT/KR2022/007534, filed on May 27, 2022, which is based on and claims the benefit of a Korean patent application number 10-2021-0100800, filed on Jul. 30, 2021, in the Korean Intellectual Property Office, the disclosure of which is incorporated by reference herein in its entirety.

BACKGROUND

1. Field

The disclosure relates to an electronic device and a method of providing connection switching for a wireless audio device.

2. Description of Related Art

A user may possess a plurality of electronic devices such as a mobile device (e.g., a smartphone), a watch (e.g., a smartwatch), a tablet personal computer (PC), and/or a television (TV), and connect an audio output device (e.g., a wireless audio device) to these electronic devices. To switch a connection of the audio output device to any one of the electronic devices, the user may use the following two methods.

First, when media plays in an electronic device registered by the same account, the audio output device may be automatically connected to the electronic device.

Second, when the user selects the connected audio output device from settings, the audio output device may be manually connected to the electronic device.

The above information is presented as background information only to assist with an understanding of the disclosure. No determination has been made, and no assertion is made, as to whether any of the above might be applicable as prior art with regard to the disclosure.

SUMMARY

When a user inputs a remote command for controlling a remote device to a device (e.g., a remote device) which is a target of remote control using an electronic device, a wireless audio device connected to the electronic device may be required to switch its connection to the remote device in response to the remote command. Thus, in a situation in which a user wearing a wireless audio device needs a remote device, there is a desire for a technology for switching, to the remote device, a connection of the wireless audio device connected to the electronic device.

Aspects of the disclosure are to address at least the above-mentioned problems and/or disadvantages and to provide at least the advantages described below. Accordingly, an aspect of the disclosure is to provide a technology for suggesting switching a connection of a wireless audio device connected to an electronic device to a target device according to an utterance of a user.

Additional aspects will be set forth in part in the description which follows and, in part, will be apparent from the description, or may be learned by practice of the presented embodiments.

In accordance with an aspect of the disclosure, an electronic device is provided. The electronic device includes a memory including therein instructions, and a processor electrically connected to the memory and configured to execute the instructions. When the instructions are executed by the processor, the processor may obtain information of a wireless audio device that is wirelessly connectable to the electronic device, determine whether an utterance of a user is a device-controlling utterance for a target device which is a target of remote control in response to the information of the wireless audio device being obtained, and suggest connection switching to the target device for the wireless audio device based on an intent in the utterance of the user in response to the utterance of the user being the device-controlling utterance.

In accordance with another aspect of the disclosure, a method of operating an electronic device is provided. The method includes obtaining information of a wireless audio device wirelessly connectable to the electronic device, determining whether an utterance of a user is a device-controlling utterance for a target device which is a target of remote control in response to the information of the wireless audio device being obtained, and suggesting connection switching to the target device for the wireless audio device based on an intent in the utterance of the user in response to the utterance being the device-controlling utterance.

According to various example embodiments described herein, providing connection switching to a target device for a wireless audio device connected to an electronic device according to an utterance of a user may provide a convenient connection switching experience for the wireless audio device in a multi-device environment.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor(s) to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
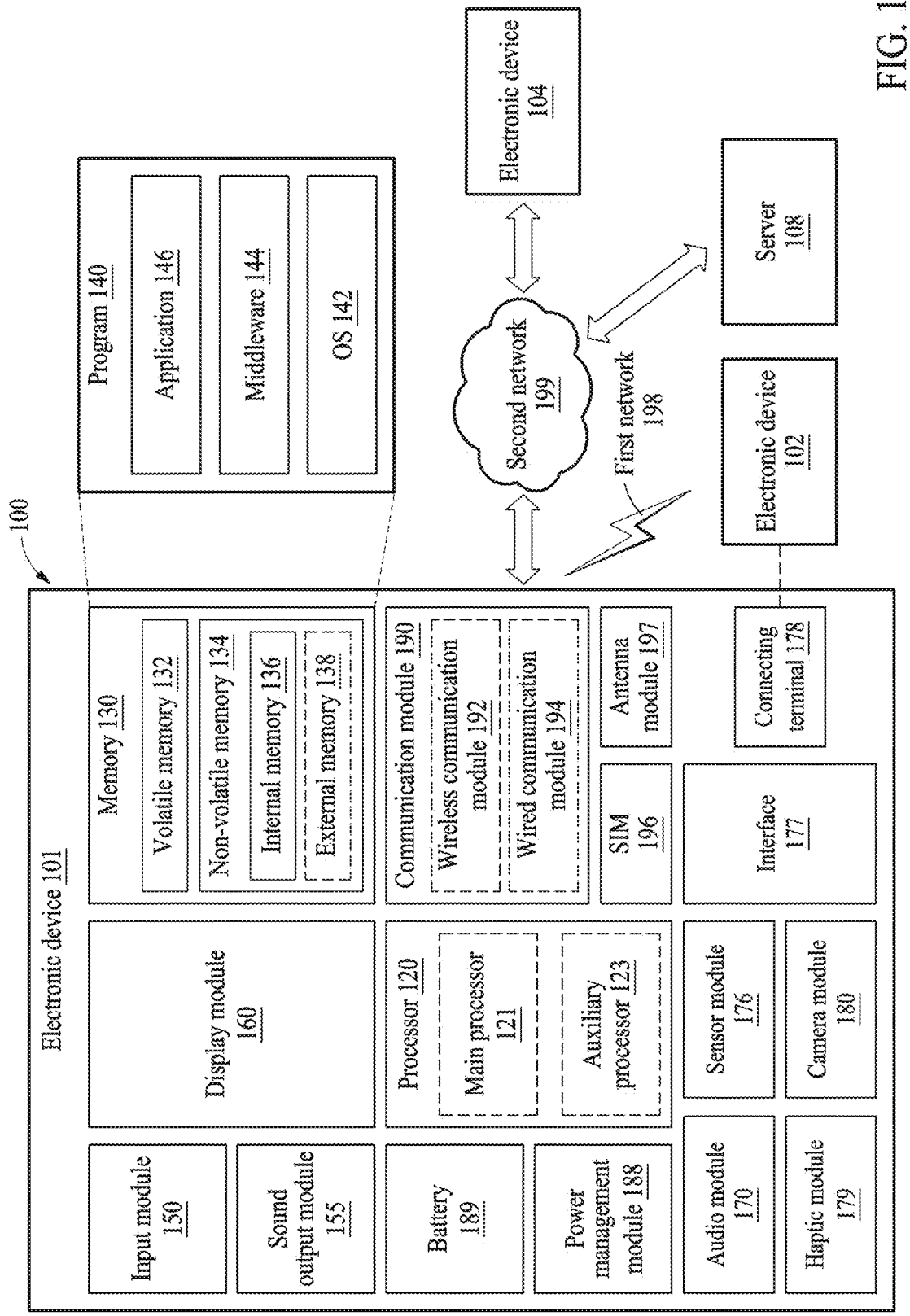
FIG. 1 is a block diagram illustrating an example electronic device in a network environment according to an embodiment of the disclosure.

FIG. 1 is a block diagram illustrating an example electronic device in a network environment according to an embodiment of the disclosure.

Referring to FIG. 1, an electronic device 101 in a network environment 100 may communicate with an external electronic device 102 via a first network 198 (e.g., a short-range wireless communication network), or communicate with at least one of an external electronic device 104 and a server 108 via a second network 199 (e.g., a long-range wireless communication network). According to an example embodiment, the electronic device 101 may communicate with the external electronic device 104 via the server 108. According to an example embodiment, the electronic device 101 may include a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, or an antenna module 197. In various example embodiments, at least one (e.g., the connecting terminal 178) of the above components may be omitted from the electronic device 101, or one or more other components may be added in the electronic device 101. In various example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another component (e.g., the sensor module 176 or the communication module 190) in a volatile memory 132, process the command or data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with, the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a portion of another component (e.g., the camera module 180 or the communication module 190) that is functionally related to the auxiliary processor 123. According to an example embodiment, the auxiliary processor 123 (e.g., an NPU) may include a hardware structure specified for artificial intelligence (AI) model processing. An AI model may be generated by machine learning. Such learning may be performed by, for example, the electronic device 101 in which the AI model is performed, or performed via a separate server (e.g., the server 108). Learning algorithms may include, but are not limited to, for example, supervised learning, unsupervised learning, semi-supervised learning, or reinforcement learning. The AI model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The AI model may alternatively or additionally include a software structure other than the hardware structure.

The memory 130 may store various data used by at least one component (e.g., the processor 120 or the sensor module 176) of the electronic device 101. The data may include, for example, software (e.g., the program 140) and input data or output data for a command related thereto. The memory 130 may include the volatile memory 132 or the non-volatile memory 134. The non-volatile memory 134 may include an internal memory 136 and an external memory 138.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing records. The receiver may be used to receive an incoming call. According to an example embodiment, the receiver may be implemented separately from the speaker or as a part of the speaker.

The display module 160 may visually provide information to the outside (e.g., a user) of the electronic device 101. The display module 160 may include, for example, a display, a hologram device, or a projector, and a control circuitry to control a corresponding one of the display, the hologram device, and the projector. According to an example embodiment, the display module 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., the external electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with an external electronic device (e.g., the external electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the external electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, ISPs, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and an external electronic device (e.g., the external electronic device 102, the external electronic device 104, or the server 108) and performing communication via the established communication channel. The communication module 190 may include one or more communication processors that are operable independently of the processor 120 (e.g., an AP) and that support direct (e.g., wired) communication or wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5th generation (5G) network, a next-generation communication network, the Internet, or a computer network (e.g., an LAN or a wide area network (WAN))). These various types of communication modules may be implemented as a single component (e.g., a single chip), or may be implemented as multiple components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4th generation (4G) network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., an mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (FD-MIMO), an array antenna, analog beamforming, or a large scale antenna. The wireless communication module 192 may support various requirements specified in the electronic device 101, an external electronic device (e.g., the external electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an example embodiment, the antenna module 197 may include an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form an mmWave antenna module. According to an example embodiment, the mmWave antenna module may include a PCB, an RFIC disposed on a first surface (e.g., a bottom surface) of the PCB or adjacent to the first surface and capable of supporting a designated high-frequency band (e.g., the mmWave band), and a plurality of antennas (e.g., array antennas) disposed on a second surface (e.g., a top or a side surface) of the PCB or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general-purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an example embodiment, all or some of operations to be executed by the electronic device 101 may be executed at one or more of the external electronic devices 102 and 104, and the server 108. For example, if the electronic device 101 needs to perform a function or a service automatically, or in response to a request from a user or another device, the electronic device 101, instead of, or in addition to, executing the function or the service, may request one or more external electronic devices to perform at least a part of the function or the service. The one or more external electronic devices receiving the request may perform the at least part of the function or the service requested, or an additional function or an additional service related to the request, and may transfer an outcome of the performing to the electronic device 101. The electronic device 101 may provide the outcome, with or without further processing of the outcome, as at least a part of a reply to the request. To that end, a cloud computing, distributed computing, mobile edge computing (MEC), or client-server computing technology may be used, for example. The electronic device 101 may provide ultra-low latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various example embodiments may be one of various types of electronic devices. The electronic device may include, for example, a portable communication device (e.g., a smartphone), a computer device, a portable multimedia device, a portable medical device, a camera, a wearable device, or a home appliance device. According to an example embodiment of the disclosure, the electronic device is not limited to those described above.

It should be appreciated that various example embodiments of the disclosure and the terms used therein are not intended to limit the technological features set forth herein to particular example embodiments and include various changes, equivalents, or replacements for a corresponding example embodiment. In connection with the description of the drawings, like reference numerals may be used for similar or related components. As used herein, "A or B," "at least one of A and B," "at least one of A or B," "A, B or C," "at least one of A, B and C," and "A, B, or C," each of which may include any one of the items listed together in the corresponding one of the phrases, or all possible combinations thereof. Terms such as "first," "second," or "first" or "second" may simply be used to distinguish the component from other components in question, and do not limit the components in other aspects (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

As used in connection with various example embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., the internal memory 136 or the external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Figure 2:
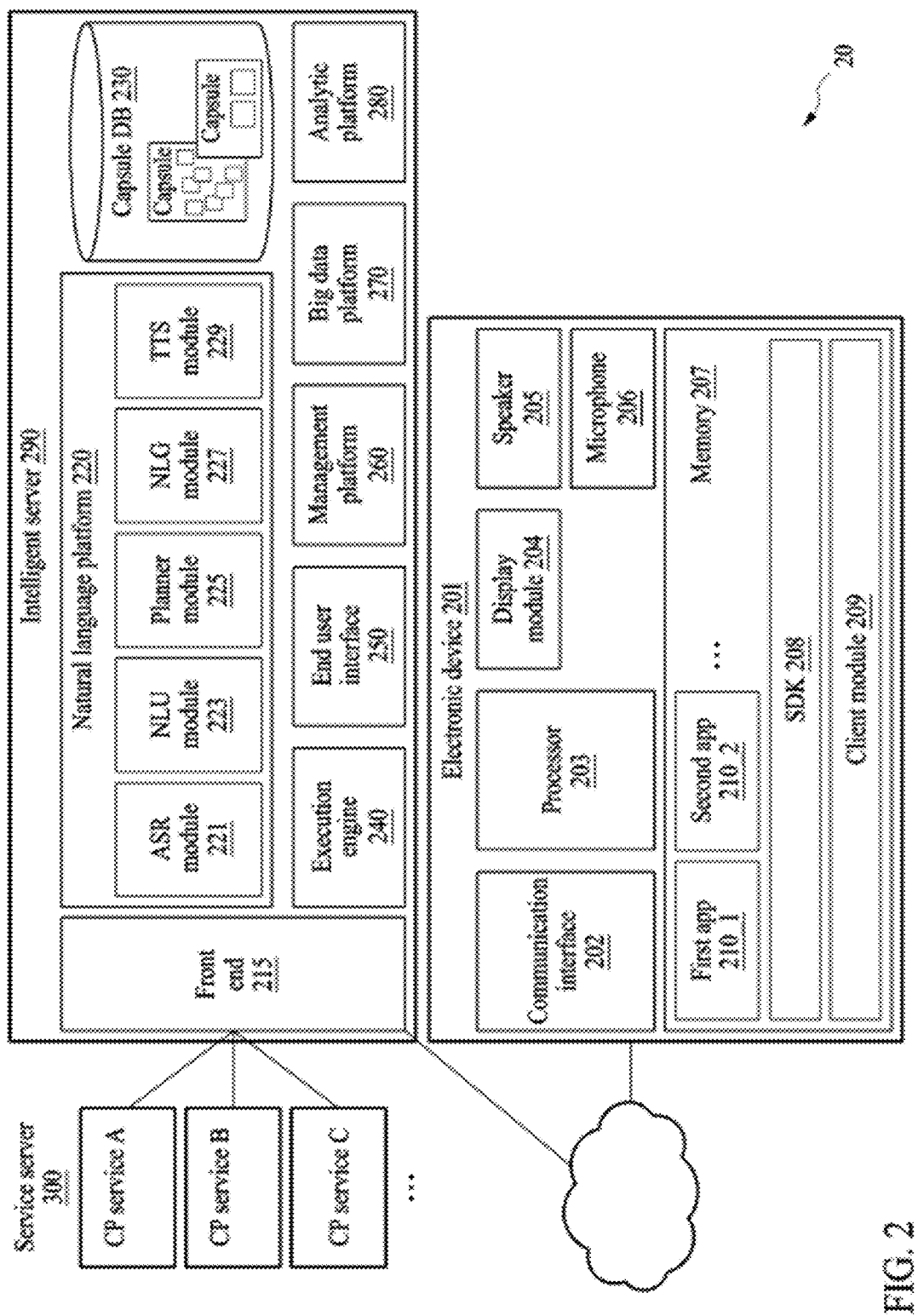
FIG. 2 is a block diagram illustrating an example integrated intelligence system according to an embodiment of the disclosure.

FIG. 2 is a block diagram illustrating an example integrated intelligence system according to an embodiment of the disclosure.

Referring to FIG. 2, according to an example embodiment, an integrated intelligence system 20 may include an electronic device 201 (e.g., the electronic device 101 of FIG. 1), an intelligent server 290 (e.g., the server 108 of FIG. 1), and a service server 300 (e.g., the server 108 of FIG. 1).

The electronic device 201 may be a terminal device (or electronic device) that is connectable to the Internet, for example, a mobile phone, a smartphone, a personal digital assistant (PDA), a laptop computer, a television (TV), a white home appliance, a wearable device, a head-mounted display (HMD), or a smart speaker.

As illustrated, the electronic device 201 may include a communication interface 202 (e.g., the interface 177 of FIG. 1), a microphone 206 (e.g., the input module 150 of FIG. 1), a speaker 205 (e.g., the sound output module 155 of FIG. 1), a display module 204 (e.g., the display module 160 of FIG. 1), a memory 207 (e.g., the memory 130 of FIG. 1), or a processor 203 (e.g., the processor 120 of FIG. 1). The components listed above may be operationally or electrically connected to each other.

The communication interface 202 may be connected to an external device to transmit and receive data to and from the external device. The microphone 206 may receive a sound (e.g., a user utterance) and convert the sound into an electrical signal. The speaker 205 may output the electrical signal as a sound (e.g., a voice or speech).

The display module 204 may display an image or video. The display module 204 may also display a graphical user interface (GUI) of an app (or an application program) being executed. The display module 204 may receive a touch input through a touch sensor. For example, the display module 204 may receive a text input through the touch sensor in an on-screen keyboard area displayed on the display module 204.

The memory 207 may store a client module 209, a software development kit (SDK) 208, and a plurality of apps (e.g., first app 210_1 and second app 210_2). The client module 209 and the SDK 208 may configure a framework (or a solution program) for performing general-purpose functions. In addition, the client module 209 or the SDK 208 may configure a framework for processing a user input (e.g., a voice input, a text input, and a touch input).

The apps stored in the memory 207 may be programs for performing designated functions. The apps may include the first app 210_1 and the second app 210_2, for example. The apps may each include a plurality of actions for performing a designated function. For example, the apps may include an alarm app, a message app, and/or a scheduling app. The apps may be executed by the processor 203 to sequentially execute at least a portion of the actions.

The processor 203 may control the overall operation of electronic device 201. For example, the processor 203 may be electrically connected to the communication interface 202, the microphone 206, the speaker 205, and the display module 204 to perform a designated operation.

The processor 203 may also perform a designated function by executing a program stored in the memory 207. For example, the processor 203 may execute at least one of the client module 209 or the SDK 208 to perform the following operations for processing a user input. For example, the processor 203 may control the actions of the apps through the SDK 208. The following operations described as operations of the client module 209 or the SDK 208 may be operations to be performed by the execution of the processor 203.

The client module 209 may receive a user input. For example, the client module 209 may receive a voice signal (or an audio signal) corresponding to a user utterance sensed through the microphone 206. Alternatively, the client module 209 may receive a touch input sensed through the display module 204. Alternatively, the client module 209 may receive a text input sensed through a keyboard or an on-screen keyboard. The client module 209 may also receive, as non-limiting examples, various types of user input sensed through an input module included in the electronic device 201 or an input module connected to the electronic device 201. The client module 209 may transmit the received user input to the intelligent server 290. The client module 209 may transmit state information of the electronic device 201 together with the received user input to the intelligent server 290. The state information may be, for example, execution state information of an app.

The client module 209 may also receive a result corresponding to the received user input. For example, when the intelligent server 290 is capable of calculating the result corresponding to the received user input, the client module 209 may receive the result corresponding to the received user input. The client module 209 may display the received result on the display module 204, and output the received result in audio through the speaker 205.

The client module 209 may receive a plan corresponding to the received user input. The client module 209 may display, on the display module 204, execution results of executing a plurality of actions of an app according to the plan. For example, the client module 209 may sequentially display the execution results of the actions on the display module 204, and output the execution results in audio through the speaker 205. For another example, electronic device 201 may display only an execution result of executing a portion of the actions (e.g., an execution result of the last action) on the display module 204, and output the execution result in audio through the speaker 205.

The client module 209 may receive a request for obtaining information necessary for calculating the result corresponding to the user input from the intelligent server 290. The client module 209 may transmit the necessary information to the intelligent server 290 in response to the request.

The client module 209 may transmit information on the execution results of executing the actions according to the plan to the intelligent server 290. The intelligent server 290 may verify that the received user input has been correctly processed using the information.

The client module 209 may include a speech recognition module. The client module 209 may recognize a voice input for performing a limited function through the speech recognition module. For example, the client module 209 may execute an intelligent app for processing a voice input to perform an organic action through a designated input (e.g., Wake up!).

The intelligent server 290 may receive information related to a user voice input from the electronic device 201 through a communication network. The intelligent server 290 may change data related to the received voice input into text data. The intelligent server 290 may generate a plan for performing a task corresponding to the user input based on the text data.

The plan may be generated by an artificial intelligence (AI) system. The AI system may be a rule-based system or a neural network-based system (e.g., a feedforward neural network (FNN) or a recurrent neural network (RNN)). Alternatively, the AI system may be a combination thereof or another AI system. The plan may also be selected from a set of predefined plans or may be generated in real time in response to a user request. For example, the AI system may select at least one plan from among the predefined plans.

The intelligent server 290 may transmit a result according to the generated plan to the electronic device 201 or transmit the generated plan to the electronic device 201. The electronic device 201 may display the result according to the plan on the display module 204. The electronic device 201 may display a result of executing an action according to the plan on the display module 204.

The intelligent server 290 may include a front end 215, a natural language platform 220, a capsule database (DB) 230, an execution engine 240, an end user interface 250, a management platform 260, a big data platform 270, or an analytic platform 280.

The front end 215 may receive a user input from the electronic device 201. The front end 215 may transmit a response corresponding to the user input.

The natural language platform 220 may include an automatic speech recognition (ASR) module 221, a natural language understanding (NLU) module 223, a planner module 225, a natural language generator (NLG) module 227, or a text-to-speech (TTS) module 229.

The ASR module 221 may convert a voice input received from the electronic device 201 into text data. The NLU module 223 may understand an intention of a user using the text data of the voice input. For example, the NLU module 223 may understand the intention of the user by performing a syntactic or semantic analysis on a user input in the form of text data. The NLU module 223 may understand semantics of a word extracted from the user input using a linguistic feature (e.g., a grammatical element) of a morpheme or phrase, and determine the intention of the user by matching the semantics of the word to the intention.

The planner module 225 may generate a plan using the intention and a parameter determined by the NLU module 223. The planner module 225 may determine a plurality of domains required to perform a task based on the determined intention. The planner module 225 may determine a plurality of actions included in each of the domains determined based on the intention. The planner module 225 may determine a parameter required to execute the determined actions or a resulting value output by the execution of the actions. The parameter and the resulting value may be defined as a concept of a designated form (or class). Accordingly, the plan may include a plurality of actions and a plurality of concepts determined by a user intention. The planner module 225 may determine a relationship between the actions and the concepts stepwise (or hierarchically). For example, the planner module 225 may determine an execution order of the actions determined based on the user intention, based on the concepts. In other words, the planner module 225 may determine the execution order of the actions based on the parameter required for the execution of the actions and results output by the execution of the actions. Accordingly, the planner module 225 may generate the plan including connection information (e.g., ontology) between the actions and the concepts. The planner module 225 may generate the plan using information stored in the capsule DB 230 that stores a set of relationships between concepts and actions.

The NLG module 227 may change designated information to the form of a text. The information changed to the form of a text may be in the form of a natural language utterance. The TTS module 229 may change the information in the form of a text to information in the form of a speech.

According to an example embodiment, all or some of the functions of the natural language platform 220 may also be implemented in the electronic device 201.

The capsule DB 230 may store therein information about relationships between a plurality of concepts and a plurality of actions corresponding to a plurality of domains. According to an embodiment, a capsule may include a plurality of action objects (or action information) and concept objects (or concept information) included in a plan. The capsule DB 230 may store a plurality of capsules in the form of a concept action network (CAN). The capsules may be stored in a function registry included in the capsule DB 230.

The capsule DB 230 may include a strategy registry that stores strategy information necessary for determining a plan corresponding to a user input, for example, a voice input. The strategy information may include reference information for determining one plan when there are a plurality of plans corresponding to the user input. The capsule DB 230 may include a follow-up registry that stores information on follow-up actions for suggesting a follow-up action to the user in a designated situation. The follow-up action may include, for example, a follow-up utterance. The capsule DB 230 may include a layout registry that stores layout information of information output through the electronic device 201. The capsule DB 230 may include a vocabulary registry that stores vocabulary information included in capsule information. The capsule DB 230 may include a dialog registry that stores information on a dialog (or an interaction) with the user. The capsule DB 230 may update the stored objects through a developer tool. The developer tool may include, for example, a function editor for updating an action object or a concept object. The developer tool may include a vocabulary editor for updating a vocabulary. The developer tool may include a strategy editor for generating and registering a strategy for determining a plan. The developer tool may include a dialog editor for generating a dialog with the user. The developer tool may include a follow-up editor for activating a follow-up objective and editing a follow-up utterance that provides a hint. The follow-up objective may be determined based on a currently set objective, a preference of the user, or an environmental condition. The capsule DB 230 may also be implemented in the electronic device 201.

The execution engine 240 may calculate a result using a generated plan. The end user interface 250 may transmit the calculated result to the electronic device 201. Accordingly, the electronic device 201 may receive the result and provide the received result to the user. The management platform 260 may manage information used by the intelligent server 290. The big data platform 270 may collect data of the user. The analytic platform 280 may manage a quality of service (QoS) of the intelligent server 290. For example, the analytic platform 280 may manage the components and processing rate (or efficiency) of the intelligent server 290.

The service server 300 may provide a designated service (e.g., food ordering or hotel reservation) to the electronic device 201. The service server 300 may be a server operated by a third party. The service server 300 may provide the intelligent server 290 with information to be used for generating a plan corresponding to a received user input. The provided information may be stored in the capsule DB 230. In addition, the service server 300 may provide resulting information according to the plan to the intelligent server 290.

In the integrated intelligence system 20 described above, the electronic device 201 may provide various intelligent services to a user in response to a user input. The user input may include, for example, an input through a physical button, a touch input, or a voice input.

The electronic device 201 may provide a speech recognition service through an intelligent app (or a speech recognition app) stored therein. In this case, the electronic device 201 may recognize a user utterance or a voice input received through the microphone 206, and provide a service corresponding to the recognized voice input to the user.

The electronic device 201 may perform a designated action alone or together with the intelligent server 290 and/or the service server 300 based on the received voice input. For example, the electronic device 201 may execute an app corresponding to the received voice input and perform the designated action through the executed app.

When the electronic device 201 provides the service together with the intelligent server 290 and/or the service server 300, the electronic device 201 may detect a user utterance using the microphone 206 and generate a signal (or voice data) corresponding to the detected user utterance. The electronic device 201 may transmit the voice data to the intelligent server 290 using the communication interface 202.

The intelligent server 290 may generate, as a response to the voice input received from the electronic device 201, a plan for performing a task corresponding to the voice input or a result of performing an action according to the plan. The plan may include, for example, a plurality of actions for performing the task corresponding to the voice input of the user, and a plurality of concepts related to the actions. The concepts may define parameters input to the execution of the actions or resulting values output by the execution of the actions. The plan may include connection information between the actions and the concepts.

The electronic device 201 may receive the response using the communication interface 202. The electronic device 201 may output a voice signal generated in the electronic device 201 to the outside using the speaker 205, or output an image generated in the electronic device 201 to the outside using the display module 204.

Figure 3:
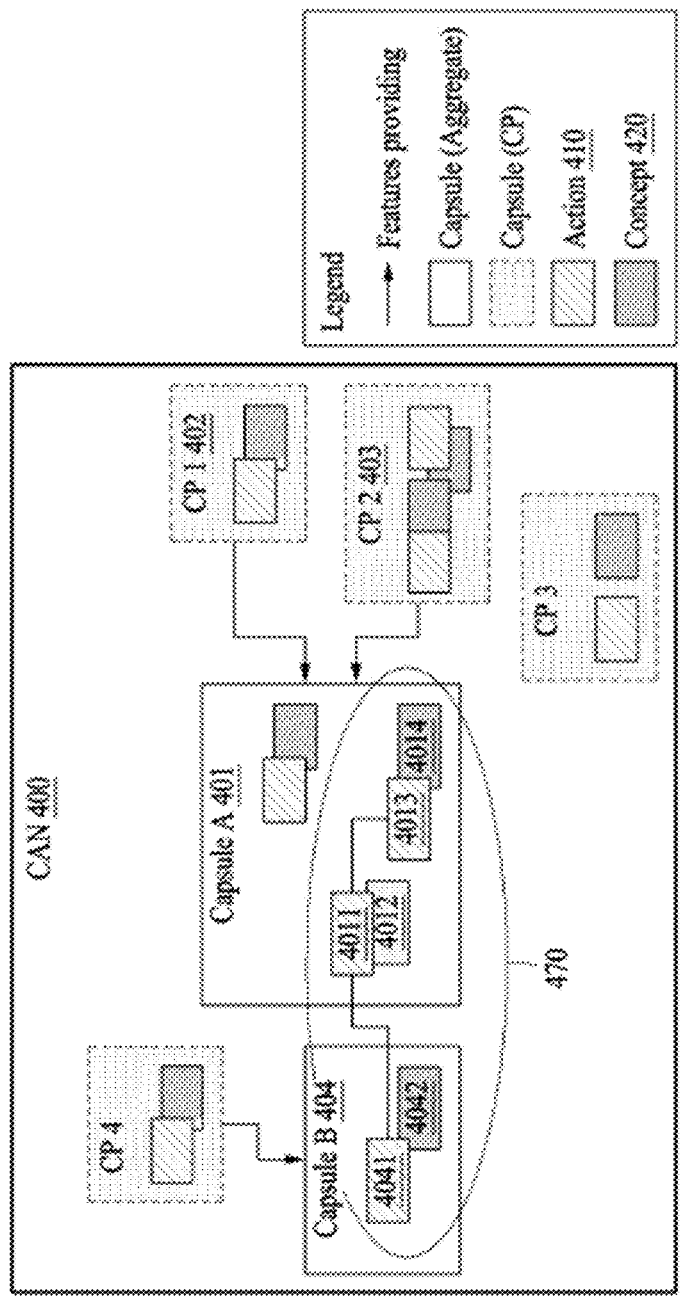
FIG. 3 is a diagram illustrating an example form in which concept and action relationship information is stored in a database (DB) according to an embodiment of the disclosure.

FIG. 3 is a diagram illustrating an example form in which concept and action relationship information is stored in a DB according to an embodiment of the disclosure.

Referring to FIG. 3, a capsule DB (e.g., the capsule DB 230 of FIG. 2) of an intelligent server (e.g., the intelligent server 290 of FIG. 2) may store therein capsules in the form of a concept action network (CAN) 400. The capsule DB may store, in the form of the CAN 400, actions for processing a task corresponding to a voice input of a user and parameters necessary for the actions.

The capsule DB may store a plurality of capsules, for example, a capsule A 401 and a capsule B 404, respectively corresponding to a plurality of domains (e.g., applications). One capsule (e.g., the capsule A 401) may correspond to one domain (e.g., a location (geo) application). In addition, one capsule may correspond to at least one service provider (e.g., CP1 402 or CP2 403) for performing a function for a domain related to the capsule. One capsule may include at least one action 410 and at least one concept 420 for performing a designated function.

A natural language platform (e.g., the natural language platform 220 of FIG. 2) may generate a plan for performing a task corresponding to a received voice input using the capsules stored in the capsule DB. For example, a planner module (e.g., the planner module 225 of FIG. 2) of the natural language platform may generate the plan using the capsules stored in the capsule DB. For example, the planner module may generate a plan 470 using actions 4011 and 4013 and concepts 4012 and 4014 of the capsule A 401 and using an action 4041 and a concept 4042 of the capsule B 404.

Figure 4:
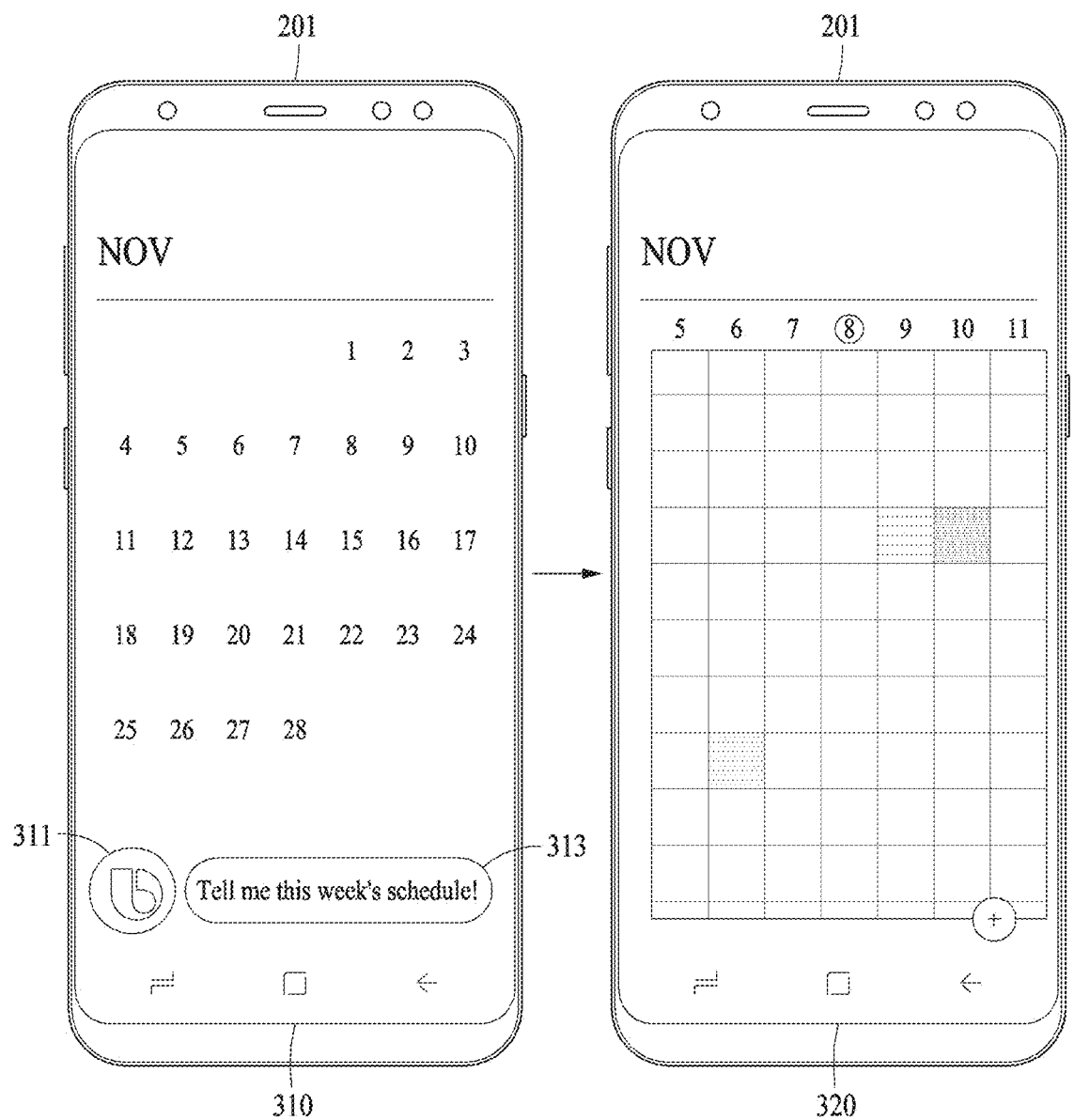
FIG. 4 is a diagram illustrating example screens showing an electronic device processing a received voice input through an intelligent application (app) according to an embodiment of the disclosure.

FIG. 4 is a diagram illustrating example screens showing an electronic device processing a received voice input through an intelligent application (app) according to an embodiment of the disclosure.

The electronic device 201 may execute an intelligent app to process a user input through an intelligent server (e.g., the intelligent server 290 of FIG. 2).

Referring to FIG. 4, on a first screen 310, when a designated voice input (e.g., Wake up!) is recognized or an input is received through a hardware key (e.g., a dedicated hardware key), the electronic device 201 may execute an intelligent app for processing the voice input. The electronic device 201 may execute the intelligent app, for example, while a scheduling app is being executed. The electronic device 201 may display an object (e.g., an icon) 311 corresponding to the intelligent app on a display (e.g., the display module 204 of FIG. 2). The electronic device 201 may receive the voice input corresponding to a user utterance. For example, the electronic device 201 may receive a voice input "Tell me this week's schedule!" The electronic device 201 may display, on the display module 204, a user interface (UI) 313 (e.g., an input window) of the intelligent app in which text data of the received voice input is displayed.

On a second screen 320, the electronic device 201 may display, on the display module 204, a result corresponding to the received voice input. For example, the electronic device 201 may receive a plan corresponding to the received user input and display, on the display module 204, "this week's schedule" according to the plan.

Figure 5:
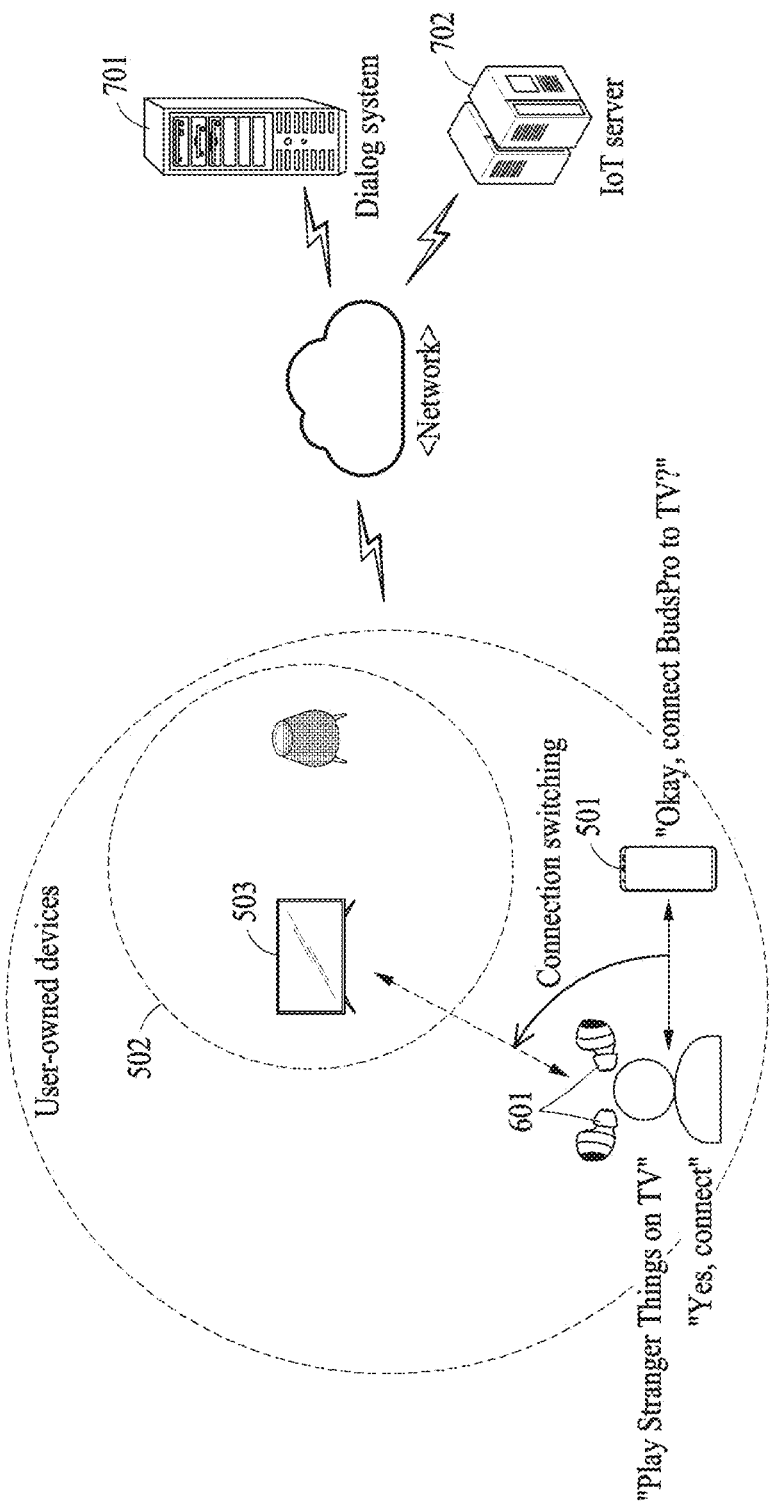
FIG. 5 is a diagram illustrating an example of a concept of providing connection switching for a wireless audio device in response to an utterance of a user according to an embodiment of the disclosure.

FIG. 5 is a diagram illustrating an example of a concept of providing connection switching for a wireless audio device in response to an utterance of a user according to an embodiment of the disclosure.

Referring to FIG. 5, according to an example embodiment, an electronic device 501 (e.g., the electronic device 101 of FIG. 1 or the electronic device 201 of FIG. 2), at least one external electronic device 502, a wireless audio device 601 (e.g., the external electronic device 102 of FIG. 1), an Internet of things (IoT) server 702, and a dialog system 701 (e.g., the intelligent server 290 of FIG. 2) may be connected through a local area network (LAN), a wide area network (WAN), a value-added network (VAN), a mobile radio communication network, a satellite communication network, or a combination thereof. The devices 501 and 502, the IoT server 702, and the dialog system 701 may communicate with one another through a wired communication method or a wireless communication method (e.g., Wi-Fi, Bluetooth™, Bluetooth low energy (BLE), ZigBee, Wi-Fi direct (WFD), ultra-wideband (UWB), infrared data association (IrDA), or near-field communication (NFC)). The electronic device 501 may be connected to the at least one external electronic device 502 through a gateway or relay and be connected directly to the at least one external electronic device 502. Alternatively, the electronic device 501 may be connected to the at least one external electronic device 502 through a server (e.g., the intelligent server 290 of FIG. 2).

The devices 501 and 502 may be connected to the wireless audio device 601 to communicate therewith through a short-range wireless communication network (e.g., Bluetooth™). The devices 501 and 502 may output sound or receive a voice (e.g., utterance) through the wireless audio device 601 that is wirelessly connected thereto.

The devices 501 and 502 may be implemented as, for example, at least one of a smartphone, a tablet personal computer (PC), a mobile phone, a speaker (e.g., AI speaker), a video phone, an e-book reader, a desktop PC, a laptop PC, a netbook computer, a workstation, a server, a personal digital assistant (PDA), a portable multimedia player (PMP), a moving picture experts group layer-3 audio (MP3) player, a mobile medical device, a camera, or a wearable device. Alternatively, the devices 501 and 502 may be implemented as home appliances. The home appliances may include, for example, a television (TV), a digital video disc (DVD) player, an audio player, a refrigerator, an air conditioner, a vacuum cleaner, an oven, a microwave, a washing machine, an air purifier, a set-top box, a home automation control panel, a security control panel, a game console, an electronic key, a camcorder, an electronic frame, or the like.

The devices 501, 502, and 601 may be user-owned devices. A user-owned device described herein may refer to a device possessed by a user. For example, the electronic device 501 and/or the wireless audio device 601 may be a listening device that receives an utterance (e.g., a command) of the user. In this example, the electronic device 501 may directly receive the utterance of the user and/or receive the utterance of the user through the wireless audio device 601. The at least one external electronic device 502 may include a target device 503. In a case in which the utterance of the user is a device-controlling utterance (e.g., an utterance for controlling a remote device) that is uttered by the user to control another electronic device besides the electronic device 501, the target device 503 (which is a target for the device-controlling utterance) may be an executing device that executes a command of the user.

When receiving the utterance of the user (e.g., "Play Stranger Things on TV"), the electronic device 501 may obtain information (e.g., a connection state, a wearing state, and device type information) of the wireless audio device 601. The connection state may indicate whether the wireless audio device 601 is connected to the electronic device 501 (over Bluetooth™, for example), and the wearing state may indicate whether the user wears the wireless audio device 601. The device type information may include a type (e.g., a model or model name) and/or an identity (ID) of the wireless audio device 601. The electronic device 501 may determine or verify the connection state of the wireless audio device 601 with respect to the electronic device 501 and the wearing state of the wireless audio device 601 with respect to the user, using the obtained information (e.g., the connection state and the wearing state) of the wireless audio device 601.

The electronic device 501 may determine whether the utterance of the user is the device-controlling utterance for the target device 503. When the utterance is the device-controlling utterance for the target device 503, the electronic device 501 may suggest (e.g., output) connection switching (e.g., Bluetooth™ (BT) connection switching) to the target device 503 for the wireless audio device 601 based on an intent in the utterance of the user. In this case, the electronic device 501 may determine a type of the target device 503 for the connection switching to the target device 503. The electronic device 501 may provide (e.g., output) the suggestion of the connection switching in a visual way or in a voice.

The IoT server 702 may obtain, store, and manage device information (e.g., a device ID, a device type, function performing ability information, device location information (e.g., registered location information), or state information) of user-owned devices (e.g., the electronic device 501 and the at least one external electronic device 502). The electronic device 501 and the at least one external electronic device 502 may be devices registered in advance in the IoT server 602 in association with account information (e.g., a user ID) of the user.

The function performing ability information in the device information may be information associated with functions of a device defined in advance for the device to perform operations. For example, when the device is an air conditioner, the function performing ability information of the air conditioner may be information associated with, for example, a temperature raising (up) function, a temperature reducing (down) function, or an air purifying function. For example, when the device is a speaker, the function performing ability information may be information associated with, for example, a volume raising (up) function, a volume lowering (down) function, or a music play function. The location information (e.g., the registered location information) in the device information may be information indicating a location (e.g., a registered location) of a device, and include a name of the location of the device and location coordinate values indicating the location of the device. For example, the location information of the device may include a name indicating a specific place inside a house, for example, a bedroom or a living room, or a name of a place such as a house or an office. For example, the location information of the device may include geofence information.

The state information in the device information may be information indicating a current state of a device and include, for example, at least one of power on/off information and information on a currently executed operation.

The IoT server 702 may receive the type of the target device 503 from the electronic device 501, generate a user-owned device list corresponding to the type of the target device 503 using the stored device information, and transmit the generated user-owned device list to the electronic device 501. The user-owned device list may include device IDs of one or more devices included in the user-owned device list.

The IoT server 702 may obtain, determine, or generate a control command for controlling a device using the stored device information. The IoT server 702 may transmit the control command to a device by which a corresponding operation is determined to be performed based on operation information. The IoT server 702 may receive, from the device performing the operation, a result of performing the operation based on the control command. The IoT server 702 may be implemented as a hardware device independent of an intelligent server (e.g., the intelligent server 290 of FIG. 2), but is not limited thereto. For example, the IoT server 702 may be a component of the intelligent server or a server designed to be distinguished by software.

The electronic device 501 may obtain a voice signal from the utterance of the user and transmit the voice signal to the dialog system 701. The voice signal may correspond to a computer-readable text that is obtained by converting a speech part of the utterance through automatic speech recognition (ASR) performed on the utterance of the user. The dialog system 701 may analyze the utterance of the user using the voice signal, and provide a device (e.g., the electronic device 501 and the target device 503) with a response (e.g., answer) and/or function (e.g., BT connection setting) to be provided to the user, using a result of the analysis (e.g., intent, entity, and/or capsule). The dialog system 701 may be implemented as software. The dialog system 701 may be partially and/or entirely implemented in the electronic device 501 and/or an intelligent server (e.g., the intelligent server 290 of FIG. 2).

The dialog system 701 may suggest switching (e.g., BT connection switching) a connection of the wireless audio device 604 to the target device 503 based on the result of the analysis (e.g., intent, entity, and capsule). To suggest such connection switching (e.g., BT connection switching) for the wireless audio device 601, the information (e.g., the determined connection state and wearing state) of the wireless audio device 601 may be used. For example, the dialog system 701 may recognize that the utterance of the user (e.g., "Play Stranger Things on TV") is the device-controlling utterance for the target device 503 and the wireless audio device 601 is connected to the electronic device 501 and is worn on the user, based on the information (e.g., the text, the information of the wireless audio device 601, and the device ID of the target device 503) transmitted from the electronic device 501. In addition, the dialog system 701 may determine that the intent in the utterance of the user (e.g., "Play Stranger Things on TV") is 'play a content' and suggest switching the connection of the wireless audio device 601 to the target device 503, for example, "Okay, connect BudsPro to TV?" The dialog system 701 may connect (e.g., set) the wireless audio device 601 to the target device 503 in response to a positive response (e.g., "Yes, connect") to the connection switching for the wireless audio device 601.

The user may receive the suggestion of the connection switching (e.g., BT connection switching) to the target device 503 for the wireless audio device 601 in response to the utterance of the user, and may thereby experience the connection switching of the wireless audio device 601 conveniently in a multi-device environment.

Figure 6:
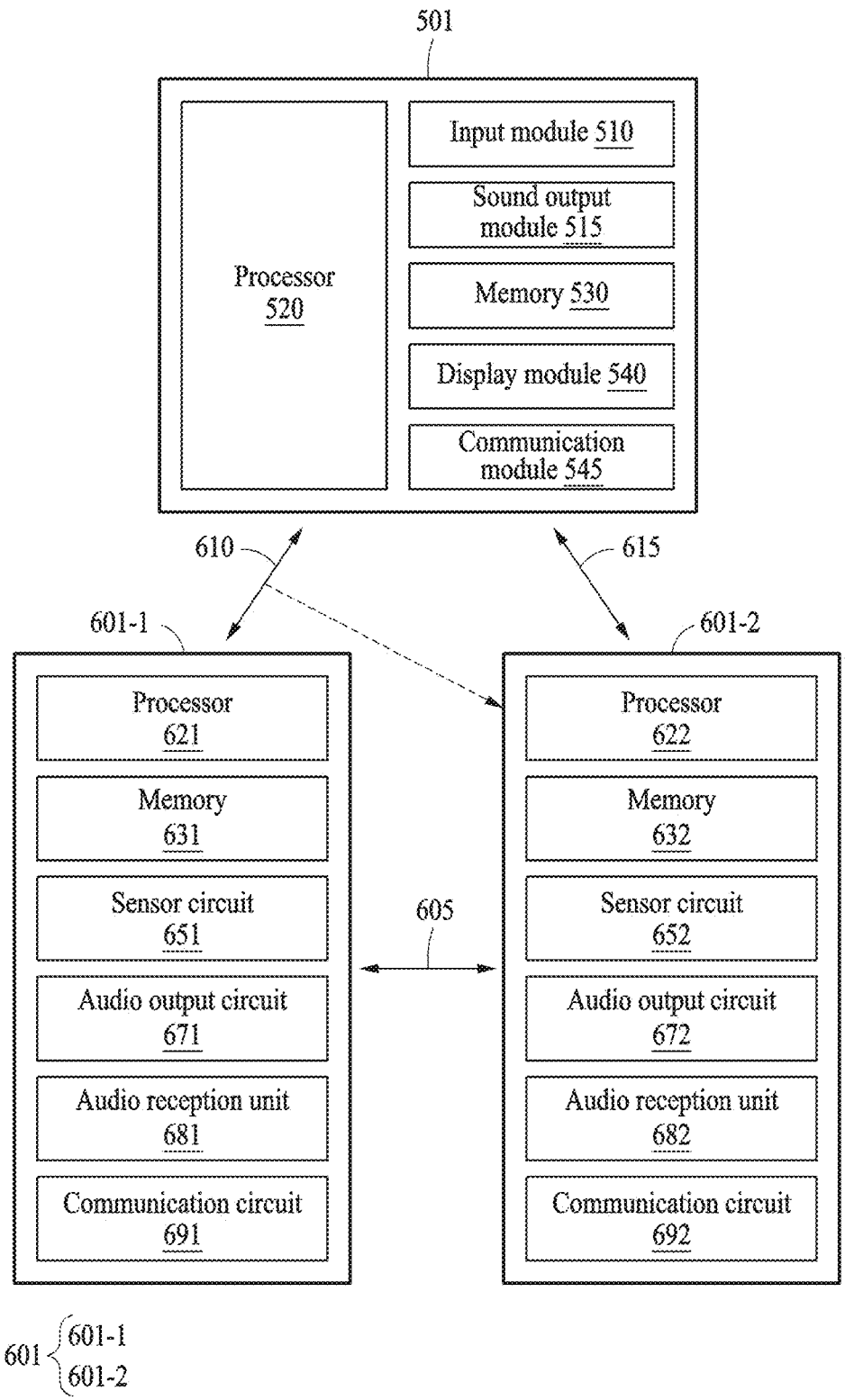
FIG. 6 is a diagram illustrating an example of a connection between an electronic device and a wireless audio device according to an embodiment of the disclosure.

FIG. 6 is a diagram illustrating an example of a connection between an electronic device and a wireless audio device according to an embodiment of the disclosure.

Referring to FIG. 6, the electronic device 501 may include an input module 510 (e.g., the input module 150 of FIG. 1 and the microphone 206 of FIG. 2), a sound output module 515 (e.g., the sound output module 155 of FIG. 1 and the speaker 205 of FIG. 2), at least one processor 520 (e.g., the processor 120 of FIG. 1 and the processor 203 of FIG. 2), a memory 530 (e.g., the memory 130 of FIG. 1 and the memory 207 of FIG. 2) electrically connected to the at least one processor 520, a display module 540 (e.g., the display module 160 of FIG. 1 and the display module 204 of FIG. 2), and a communication module 545 (e.g., the communication module 190 of FIG. 1 and the communication interface 202 of FIG. 2). The communication module 545 may be configured to support wireless communication based on a Bluetooth™ protocol (e.g., Bluetooth legacy and/or BLE). The communication module 545 may also be configured to support communication based on a wireless communication standard (e.g., cellular and/or Wi-Fi) excluding the Bluetooth™ protocol.

The wireless audio device 601 may include a first wireless audio device 601-1 and a second wireless audio device 601-2. The first wireless audio device 601-1 may establish, with the second wireless audio device 601-2, a first link 605 based on the Bluetooth™ protocol. For example, as one of the first wireless audio device 601-1 and the second wireless audio device 601-2 transmits an advertising signal based on a BLE protocol and the other receives the advertising signal, the first wireless audio device 601-1 and the second wireless audio device 601-2 may recognize each other and establish the first link 605 therebetween. For another example, the first wireless audio device 601-1 and the second wireless audio device 601-2 may recognize each other through an inquiry procedure and establish the first link 605 through a page and page scan.

The electronic device 501 may be connected to the first wireless audio device 601-1 through a second link 610. For example, the electronic device 501 and the first wireless audio device 601-1 may communicate in a timeslot unit that is set based on a clock of a primary device of the second link 610. The electronic device 501 may be connected to the second wireless audio device 601-2 through a third link 615. For example, the electronic device 601 may establish the third link 615 after being connected to the first wireless audio device 601-1. The third link 615 may be omitted.

In response to an utterance of a user being received, the electronic device 501 may obtain at least one of a connection state, a wearing state, and device type information from the wireless audio device 601. The wireless audio device 601 may determine the wearing state by detecting whether the user is wearing the wireless audio device 601, and transmit the determined wearing state to the electronic device 501. The electronic device 501 may obtain the connection state by detecting whether the wireless audio device 601 is connected to the electronic device 501, or obtain the connection state detected by the wireless audio device 601 from the wireless audio device 601. The electronic device 501 may obtain the device type information from the wireless audio device 601 upon receiving the utterance of the user. Alternatively, the device type information may be previously transmitted from the wireless audio device 601 when the wireless audio device 601 is connected to the electronic device 501, and be stored in the electronic device 501.

The first wireless audio device 601-1 may include a processor 621, a memory 631, a sensor circuit 651, an audio output circuit 671, an audio reception circuit 681, and/or a communication circuit 691. The processor 621 may be operatively connected to the sensor circuit 651, the communication circuit 691, the audio output circuit 671, the audio reception circuit 681, and the memory 631.

The sensor circuit 651 may include at least one sensor. The sensor circuit 651 may sense information on the wearing state of the first wireless audio device 601-1, bioinformation of a wearer (e.g., the user), and/or a movement. The sensor circuit 651 may include, for example, a proximity sensor for sensing the wearing state, a biosensor (e.g., a heart rate sensor) for sensing the bioinformation, and/or a motion sensor (e.g., an acceleration sensor) for sensing the movement.

The sensor circuit 651 may further include at least one of a bone conduction sensor or an acceleration sensor. The acceleration sensor may be disposed near the skin to sense bone conduction. For example, the acceleration sensor may be configured to sense vibration (or shaking) information in a kilohertz (kHz) unit using kHz-unit sampling relatively higher than general motion sampling. The processor 621 may receive results of identifying a voice, sensing a voice, sensing a tap, and/or sensing a wearing state in a noisy environment using a vibration based on a significant axis (at least one of an x axis, a y axis, and a z axis) in the vibration information of the acceleration sensor.

The audio output circuit 671 may be configured to output a sound. The audio reception circuit 681 may include a single microphone or a plurality of microphones. The audio reception circuit 681 may be configured to receive an utterance of the user (e.g., a command and a dialog) through the single microphone or the plurality of microphones to obtain an audio signal. The microphones may respectively correspond to different audio reception paths. For example, when the audio reception circuit 681 includes a first microphone and a second microphone, an audio signal obtained by the first microphone and an audio signal obtained by the second microphone may be referred to different audio channels. The processor 621 may obtain audio data using at least one of a plurality of microphones connected to the audio reception circuit 681. For example, the processor 621 may dynamically select or determine at least one microphone for obtaining the audio data from among the microphones. The processor 621 may obtain the audio data through beamforming performed using the microphones. The memory 631 may store one or more instructions that, when executed, cause the processor 621 to perform various operations of the first wireless audio device 601-1.

The processor 621 may obtain the audio data (e.g., audio data associated with the utterance of the user) using at least one of the audio reception circuit 681 or the sensor circuit 651. For example, the processor 621 may obtain the audio data using one or more microphones connected to the audio reception circuit 681. The processor 621 may obtain the audio data by sensing a vibration corresponding to an audio signal using the sensor circuit 651. For example, the processor 621 may obtain the audio data using at least one of a motion sensor, a bone conduction sensor, or an acceleration sensor. The processor 621 may be configured to process (e.g., perform noise suppression, noise cancellation, or echo cancellation) the audio data obtained through various paths (e.g., at least one of the audio reception circuit 681 or the sensor circuit 651).

The second wireless audio device 601-2 may include a processor 622, a memory 632, a sensor circuit 652, an audio output circuit 672, an audio reception circuit 682, and/or a communication circuit 692. The processor 622, the memory 632, the sensor circuit 652, the audio output circuit 672, the audio reception circuit 682, and the communication circuit 692 of the second wireless audio device 601-2 may perform substantially the same operations as those performed by the processor 621, the memory 631, the sensor circuit 651, the audio output circuit 671, the audio reception circuit 681, and the communication circuit 691 of the first wireless audio device 601-1. Thus, a detailed or repeated description of the second wireless audio device 601-2 will be omitted here for conciseness.

Figure 7:
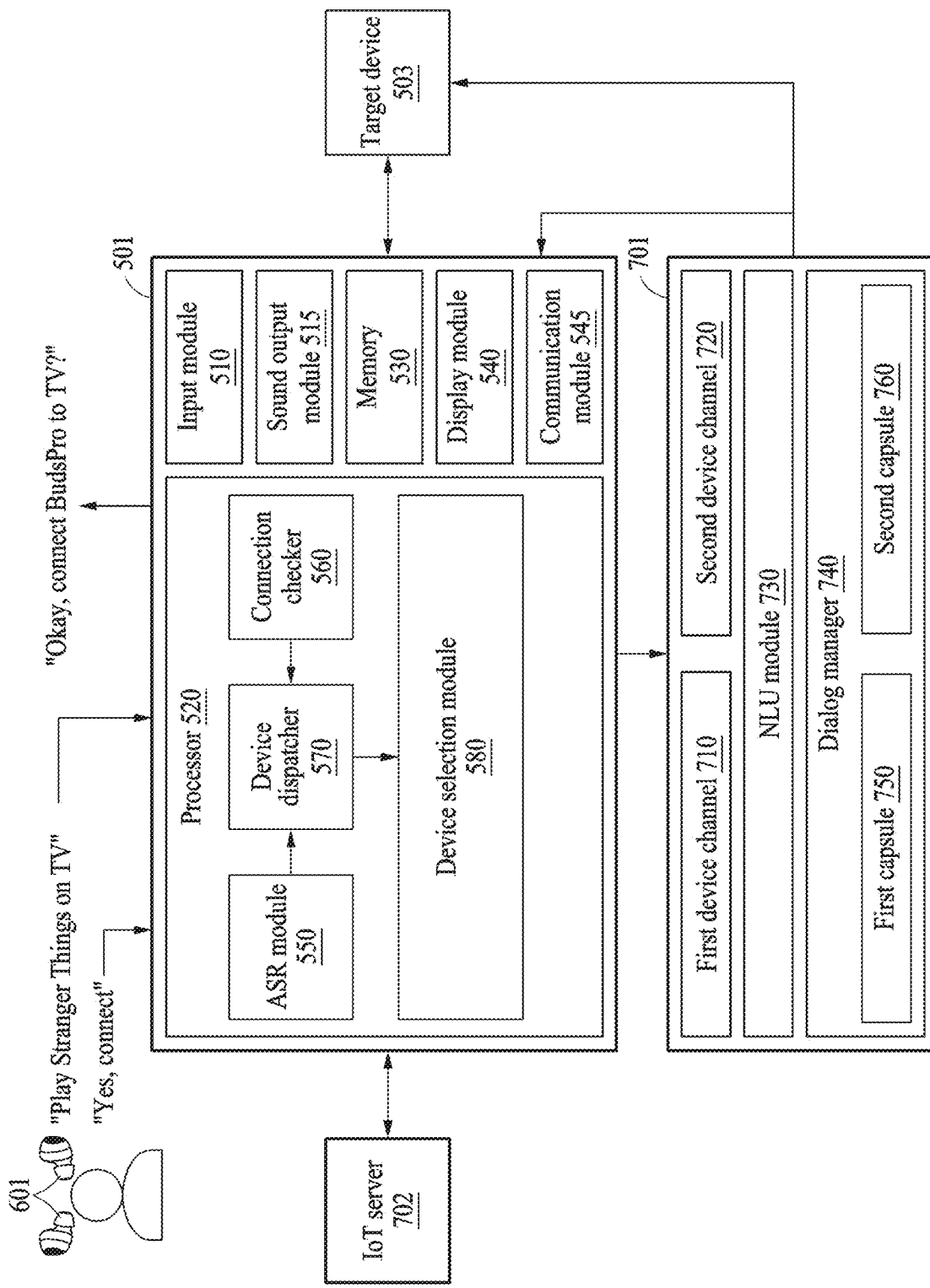
FIG. 7 is a diagram illustrating an example electronic device and an example dialog system for providing connection switching for a wireless audio device in response to an utterance of a user according to an embodiment of the disclosure.

FIG. 7 is a diagram illustrating an example electronic device and an example dialog system for providing connection switching for a wireless audio device in response to an utterance of a user according to an embodiment of the disclosure.

Referring to FIG. 7, according to an embodiment, the electronic device 501 may support a voice assistant (e.g., a voice assistant service, Bixby). The voice assistant may be configured or supported by at least one of an ASR module 550, a connection checker 560 (e.g., a Bluetooth™ connection checker), a device dispatcher 570, and a device selection module 580 that are included in the electronic device 501. The ASR module 550, the connection checker 560, the device dispatcher 570, and the device selection module 580, which may be executable by the at least one processor 520, may be configured as at least one of a program code including instructions that may be stored in the memory 530, an application, an algorithm, a routine, a set of instructions, or an AI learning model. In addition, at least one of the ASR module 550, the connection checker 560, the device dispatcher 570, and the device selection module 580 may be implemented by hardware or a combination of hardware and software.

The electronic device 501 may receive an utterance of a user (e.g., "Play Stranger Things on TV") through the input module 510 and/or the wireless audio device 601. The ASR module 550 may perform ASR on the utterance of the user to convert a speech part of the utterance into a computer-readable text. For example, the ASR module 550 may perform the ASR on the utterance of the user, using an acoustic model (AM) and/or a language model (LM). The ASR module 550 may output the text to the device dispatcher 570.

In response to the utterance of the user being received, the connection checker 560 may obtain information (e.g., a connection state, a wearing state, and device type information) of the wireless audio device 601. The connection checker 560 may determine (e.g., verify) the connection state of the electronic device 501 with respect to the wireless audio device 601 and the wearing state of the user with respect to the wireless audio device 601, using the obtained information (e.g., the connection state and the wearing state) of the wireless audio device 601. The connection checker 560 may transmit the information (e.g., the determined connection state and wearing state) of the wireless audio device 601 to the dialog system 701.

The device dispatcher 570 may determine whether the utterance of the user is a device-controlling utterance for the target device 503 from the text. In addition, in response to the information (e.g., the determined connection state and wearing state) of the wireless audio device 601, the device dispatcher 570 may determine whether the utterance of the user is the device-controlling utterance for the target device 503 from the text. The device dispatcher 570 may determine whether the utterance of the user is the device-controlling utterance for the target device 503 based on a specified pattern (e.g., a device-related word or phrase) extracted from within the text. For example, when the text converted from the utterance of the user is "Play Stranger Things on TV," the device dispatcher 570 may determine the utterance to be the device-controlling utterance from a pattern "on TV." The device-controlling utterance described herein may refer to an utterance for controlling another electronic device.

The device dispatcher 570 may determine whether the utterance of the user is the device-controlling utterance for the target device 503 based on an inferred intent in the text. The intent may refer to information indicating an intention of the user that is determined through an analysis of the text. The intent, which refers to the information indicating an intention of an utterance of a user, may correspond to information indicating an operation of a device (e.g., the target device 503) requested by the user. For example, when the text converted from the utterance of the user is "Play Stranger Things on TV," the device dispatcher 570 may determine the utterance of the user to be the device-controlling utterance as the intent is 'play a content.' For example, when the text converted from the utterance of the user is "Turn down the volume on TV," the device dispatcher 570 may determine the utterance of the user to be the device-controlling utterance as the intent is 'control the volume.'

The device dispatcher 570 may determine a type (e.g., a device type) of the target device 503. The device dispatcher 570 may determine the type of the target device 503 using the intent inferred from the text. The 'type' or 'device type' described herein may refer to a category of a device classified according to a set criterion. The type of a device may be determined based on a function of the device or a purpose of use of the device. The device may be classified into one of types, for example, an audio device (e.g., a speaker) configured to output an audio signal, an imaging device (e.g., a TV) configured to output both an audio signal and a video signal, an air conditioning device (e.g., an air conditioner) configured to control a temperature of the air, and/or a cleaning device (e.g., a robot vacuum cleaner), but is not limited thereto.

In response to the device-controlling utterance, the device selection module 580 may communicate with the IoT server 702 to obtain a user-owned device list corresponding to the type of the target device 503 (e.g., DeviceType=TV). When receiving the type of the target device 503 from the device dispatcher 570, the IoT server 702 may generate the user-owned device list including user-owned devices corresponding to the type of the target device 503, and transmit the generated user-owned device list to the device selection module 580.

The device selection module 580 may select (e.g., specify or designate) a device as the target device 503 from the user-owned device list including one or more user-owned devices. When the user-owned device list includes a plurality of devices, the device selection module 580 may prompt the user with the user-owned device list. The user may select a device as the target device 503 from the user-owned device list. The device selection module 580 may transmit an ID of the selected device to the dialog system 701.

The dialog system 701 may support a voice assistant (e.g., a voice assistant service, Bixby). The dialog system 701 may include one or more device channels 710 and 720, an NLU module 730, and a dialog manager 740. The dialog system 701 may be connected to the electronic device 501 through a first device channel 710 and to the target device 503 through a second device channel 720. The NLU module 730 and the dialog manager 740 may be configured by at least one of a program code including storable instructions, an application, an algorithm, a routine, a set of instructions, or an AI learning model. The NLU module 730 and/or the dialog manager 740 may be partially and/or entirely implemented in the electronic device 501 and/or an intelligent server (e.g., the intelligent server 290 of FIG. 2).

The NLU module 730 (e.g., the NLU module 223 of FIG. 2) may receive the text converted from the utterance of the user from the device dispatcher 570. The NLU module 730 may analyze the text obtained through the conversion of the utterance of the user, and determine an intent, an entity, and/or a capsule associated with the utterance of the user. For example, when the text converted from the utterance of the user is "Play Stranger Things on TV," an intent may be determined to be 'play a content' (e.g., play a video) as "Stranger Things" is a content (e.g., video content) and "play" is requested.

The dialog manager 740 may determine (or generate) a response (e.g., an answer) to be transmitted to the user using a result of the analysis (e.g., the intent, entity, and/or capsule) obtained from the NLU module 730. In addition, the dialog manager 740 may suggest, to the user, a function (e.g., BT connection setting) to be provided to the user, and may perform the function when the user responds to the suggestion. For the response determining operation and/or the function suggesting operation of the dialog manager 740, the information (e.g., the determined connection state and wearing state) of the wireless audio device 601 may be used.

The dialog manager 740 may verify that the electronic device 501 and the wireless audio device 601 are connected (e.g., BT connection) to each other and the user wears the wireless audio device 601, using the information (e.g., the determined connection state and wearing state) of the wireless audio device 601. When the wireless audio device 601 is connected to the electronic device 501 and is worn on the user, the dialog manager 740 may suggest (e.g., "Okay, connect BudsPro to TV?"), to the user (e.g., the electronic device 501), connection switching to the target device 503 for the wireless audio device 601 using a first capsule 750 (e.g., Buds Capsule). In this case, the dialog manager 740 may determine to suggest, to the user (e.g., the electronic device 501), the connection switching for the wireless audio device 601 based on the intent in the utterance of the user. For example, when the intent in the utterance of the user is to request playing a media content (e.g., a video and audio), for example, to request playing the media content in the target device 503, the dialog manager 740 may suggest, to the electronic device 501, the connection switching to the target device 503 for the wireless audio device 601. For another example, when the intent in the utterance of the user is to request mirroring or casting, for example, to request mirroring or casting to the target device 503 while a media content is playing in the electronic device 501, the dialog manager 740 may suggest, to the electronic device 501, the connection switching to the target device 503 for the wireless audio device 601.

The electronic device 501 may suggest (e.g., "Yes, connect BudsPro to TV?") the connection switching to the target device 503 for the wireless audio device 601 in a visual way or in a voice. For example, the electronic device 501 may output the suggestion of the connection switching to an object (e.g., a UI) through the display module 540. For another example, the electronic device 501 may output, as an audio signal, the suggestion of the connection switching through the wireless audio device 601 and/or the sound output module 515.

The dialog manager 740 may receive, from the electronic device 501, a response to the connection switching for the wireless audio device 601. When the response is positive (e.g., "Yes, connect"), the dialog manager 740 may invoke a setting application of the target device 503 using a second capsule 760 (e.g., a setting capsule) to allow the wireless audio device 601 to be connected to the target device 503. In this case, the dialog manager 740 may perform the connection switching using the ID (e.g., Buds Device ID) of the wireless audio device 601 that is transmitted from the first capsule 750 and the ID of the target device 503 that is transmitted from the device selection module 580.

Figure 8A:
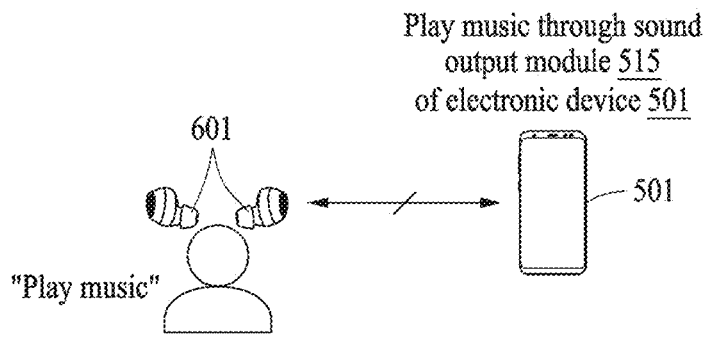
FIGS. 8A, 8B, and 8C are diagrams illustrating example operations provided based on information of a wireless audio device according to various embodiments of the disclosure.
Figure 8B:
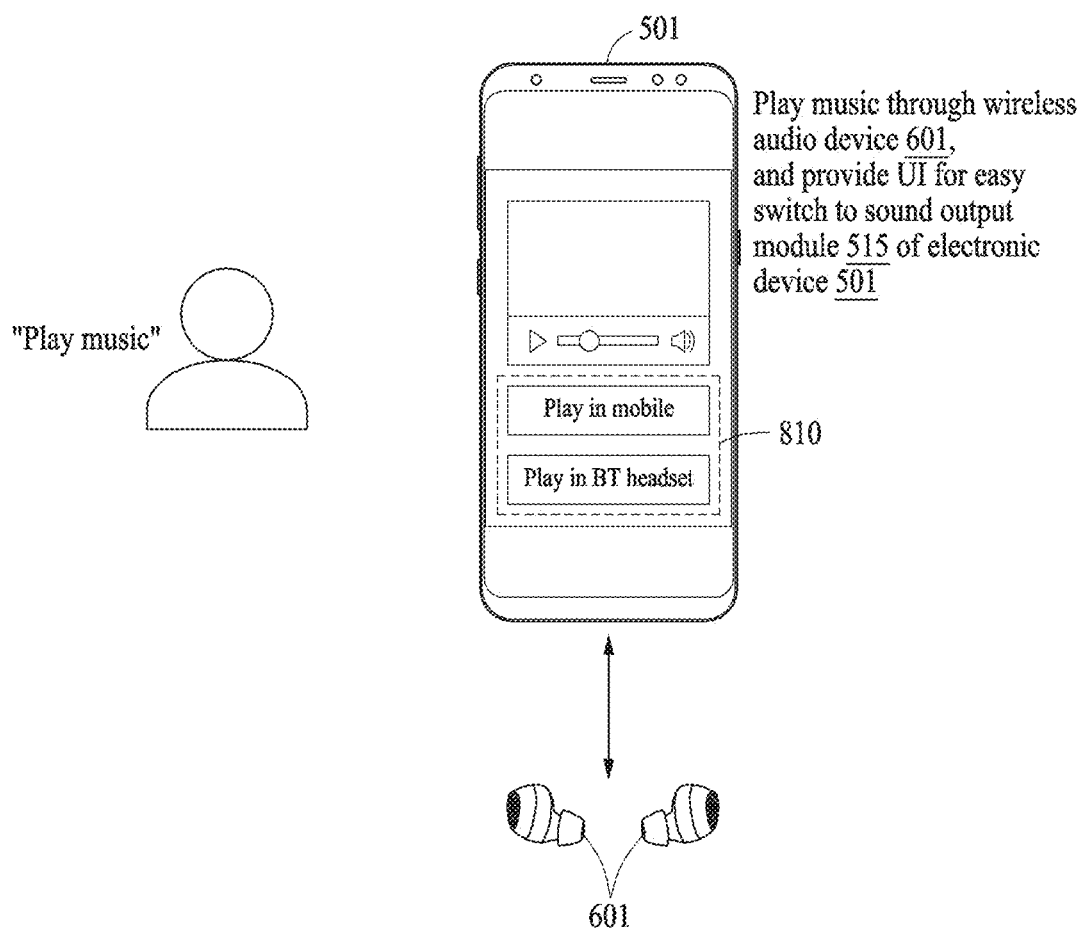
Figure 8C:
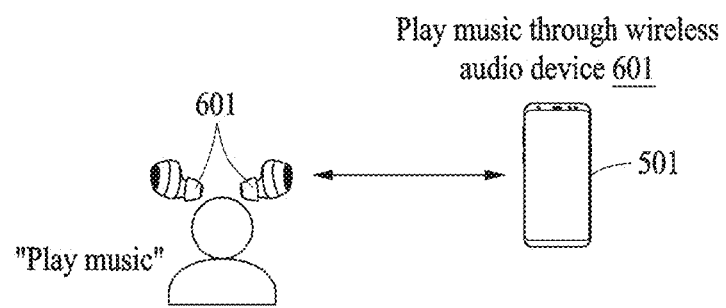

FIGS. 8A, 8B, and 8C are diagrams illustrating example operations provided based on information of a wireless audio device according to various embodiments of the disclosure.

FIGS. 8A to 8C illustrate operations performed based on a connection state and a wearing state of the wireless audio device 601. The electronic device 501 may determine an utterance of a user (e.g., "Play music") to be a device-controlling utterance (e.g., a device-controlling utterance for the electronic device 501). In this case, the user may receive a user experience provided according to a situation that is based on a connection state and a wearing state of the wireless audio device 601.

Referring to FIG. 8A, when the wireless audio device 601 is not connected to the electronic device 501, the music may be output (or played) through the sound output module 515 of the electronic device 501. In this case, the user may or may not wear the wireless audio device 601.

Referring to FIG. 8B, when the user does not wear the wireless audio device 601 while the wireless audio device 601 is connected to the electronic device 501, the music may be output (or played) through the wireless audio device 601. While the music is being output through the wireless audio device 601, an object 810 (e.g., a UI) that allows a music output path to be readily switched to the sound output module 515 of the electronic device 501 may be provided to the electronic device 501.

Referring to FIG. 8C, when the wireless audio device 601 is connected to the electronic device 501 and is worn on the user, the music may be output (or played) through the wireless audio device 601.

Figure 9A:
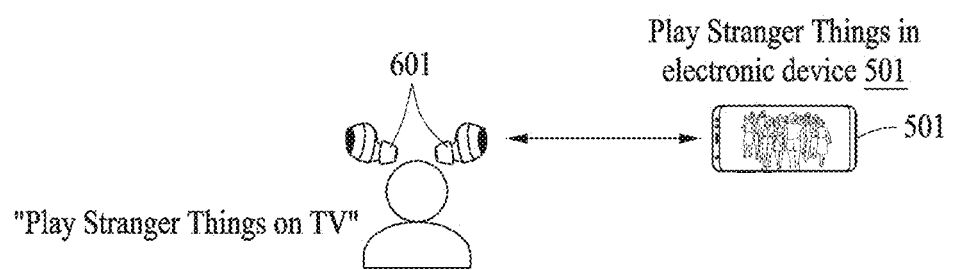
FIGS. 9A, 9B, and 9C are diagrams illustrating example operations provided based on whether an utterance of a user is a device-controlling utterance for a target device according to various embodiments of the disclosure.
Figure 9B:
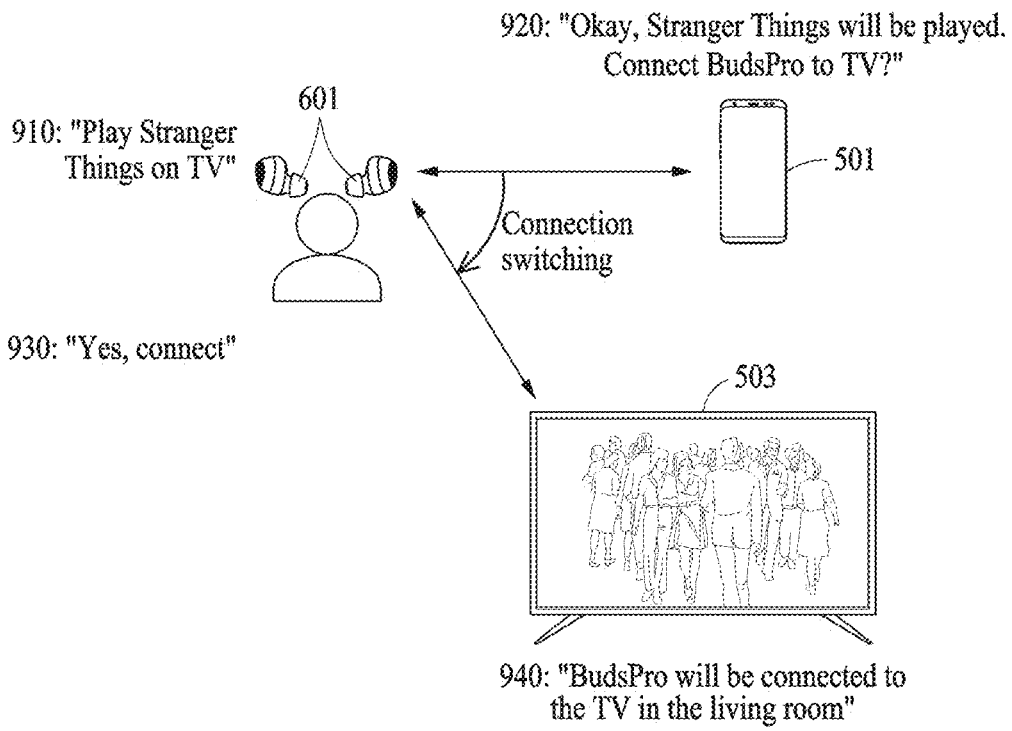
Figure 9C:
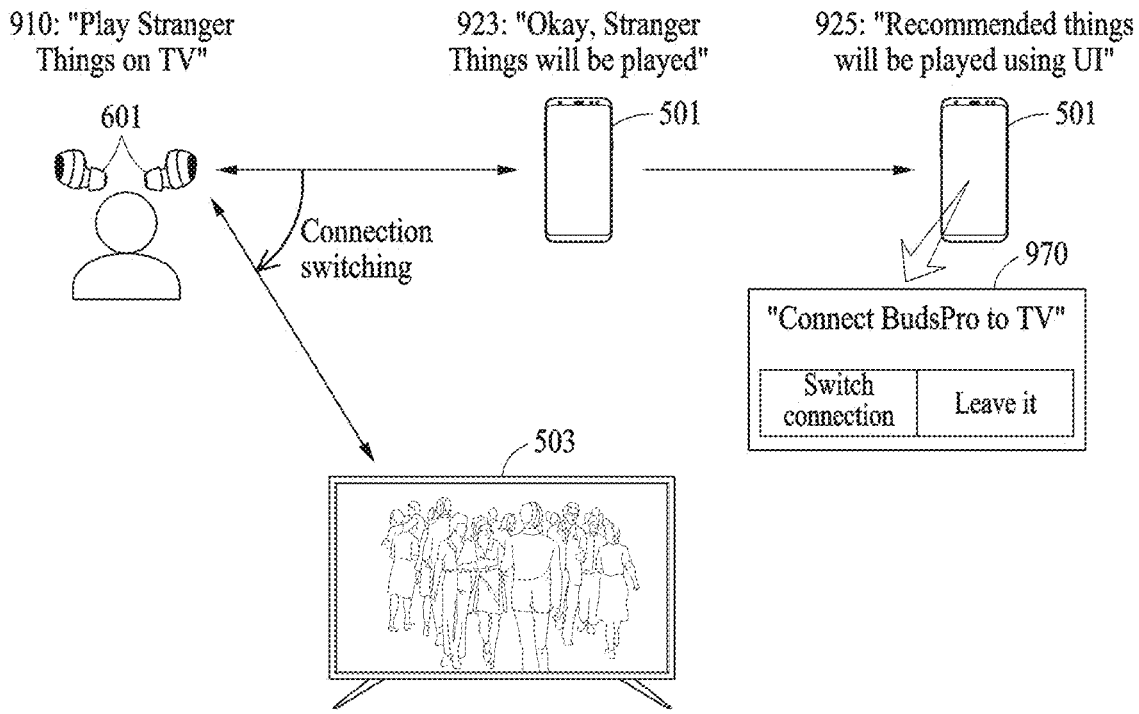

FIGS. 9A, 9B, and 9C are diagrams illustrating example operations provided based on whether an utterance of a user is a device-controlling utterance for a target device according to various embodiments of the disclosure.

FIGS. 9A to 9C illustrate operations performed based on whether an utterance of a user is a device-controlling utterance for the target device 503 while the wireless audio device 601 is connected to the electronic device 501 and the user is wearing the wireless audio device 601. The user may receive various user experiences based on whether the utterance of the user is the device-controlling utterance for the target device 503.

Referring to FIG. 9A, the electronic device 501 may determine that an utterance of the user (e.g., "Play Stranger Things") is a device-controlling utterance but is a device-controlling utterance for the electronic device 501, for example, an utterance not for controlling a remote device. A content (e.g., Stranger Things) corresponding to the utterance of the user may be played in the electronic device 501.

Referring to FIG. 9B, in operation 910, the electronic device 501 may determine an utterance of the user (e.g., "Play Stranger Things on TV") to be a device-controlling utterance for the target device 503 (e.g., an utterance for controlling a remote device). In operation 920, the dialog system 701 may suggest (e.g., "Okay, Strange Things will be played. Connect BudsPro to TV?") a connection switching (e.g., BT connection switching) to the target device 503 for the wireless audio device 601. In operation 930, the user may input, to the electronic device 501, a response (e.g., "Yes, connect") to the suggestion of the connection switching for the wireless audio device 601. In operation 940, the dialog system 701 may connect the wireless audio device 601 to the target device 503 in response to a positive response. For the connection switching to the target device 503 for the wireless audio device 601, a response (e.g., "Okay, BudsPro will be connected to the TV in the living room") notifying the user of a connection (or a start of the connection) may be provided. In the example of FIG. 9B, the suggestion of the connection switching to the target device 503 for the wireless audio device 601 may be provided in the form of a dialog.

Referring to FIG. 9C, in operation 910, the electronic device 501 may determine an utterance of the user (e.g., "Play Stranger Things on TV") to be a device-controlling utterance for the target device 503 (e.g., an utterance for controlling a remote device), as the same as described with reference to FIG. 9B. In operations 923 and 925, when the dialog system 701 determines connection switching (e.g., BT connection switching) to the target device 503 for the wireless audio device 601, a response to be transmitted to the user (e.g., "Okay, Stranger Things will be played") may be provided, and then a suggestion of the connection switching for the wireless audio device 601 may be provided through a UI 970 on the electronic device 501. When the user selects 'switch connection' on the UI 970, a connection of the wireless audio device 601 may be switched to the target device 503. In the example of FIG. 9C, the suggestion of the connection switching to the target device 503 for the wireless audio device 601 may be provided in the form of a UI.

Figure 10A:
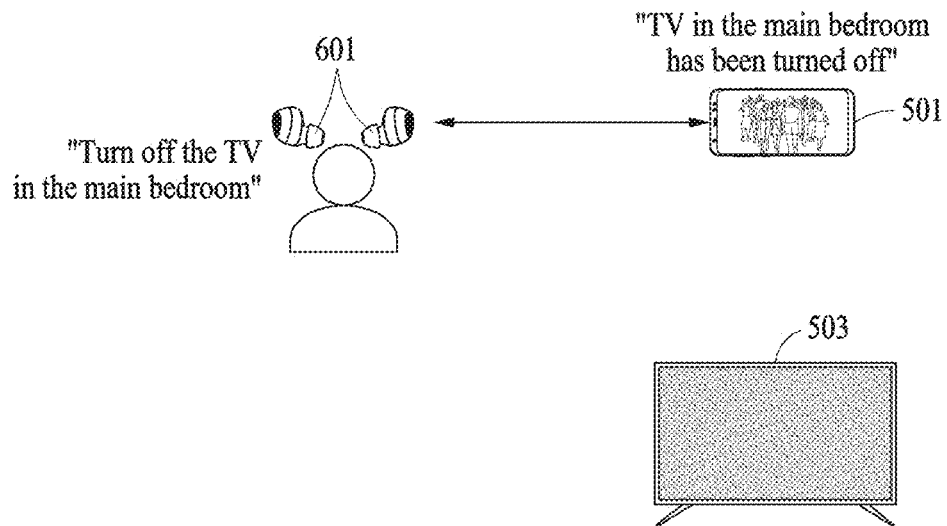
FIGS. 10A, 10B, and 10C are diagrams illustrating example operations provided based on an intent in an utterance of a user according to various embodiments of the disclosure.
Figure 10B:
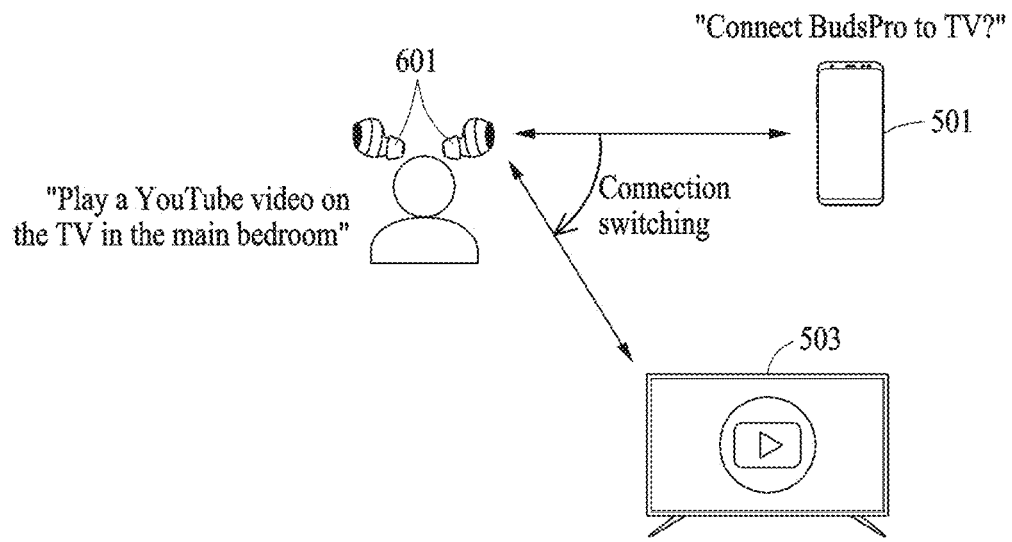
Figure 10C:
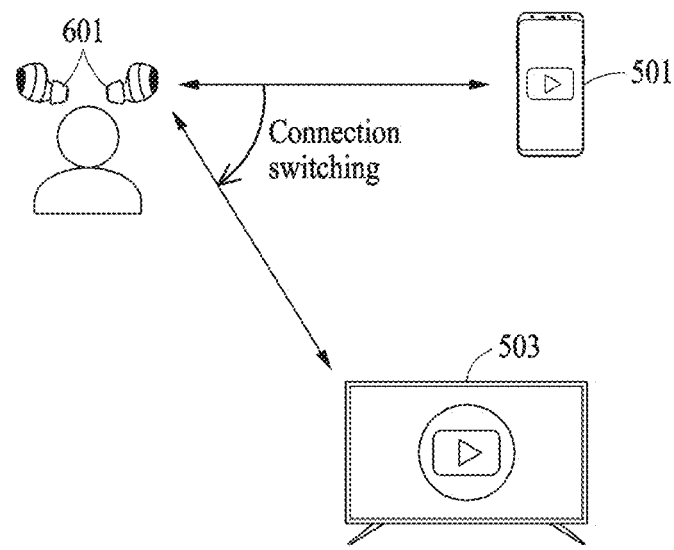

FIGS. 10A, 10B, and 10C are diagrams illustrating example operations provided based on an intent in an utterance of a user according to various embodiments of the disclosure.

FIGS. 10A to 10C illustrate operations performed based on an intent in an utterance of a user when the wireless audio device 601 is connected to the electronic device 501 and is worn on the user. The user may receive various user experiences based on the intent in the utterance of the user.

Referring to FIG. 10A, the electronic device 501 may determine an utterance of the user (e.g., "Turn off the TV in the main bedroom") to be a device-controlling utterance for the target device 503 (e.g., an utterance for controlling a remote device). The dialog system 701 may determine that an intent in the utterance of the user does not correspond to playing a media content or performing mirroring (or casting), but to executing a simple function (e.g., 'power off'). In this case, the wireless audio device 601 may maintain a state of being connected to the electronic device 501, and the target device 503 may be turned off. The user may then receive a response (e.g., "TV in the main bedroom has been turned off") to the utterance of the user.

Referring to FIG. 10B, the electronic device 501 may determine an utterance of the user (e.g., "Play a YouTube video on the TV in the main bedroom") to be a device-controlling utterance for the target device 503 (e.g., an utterance for controlling a remote device). The dialog system 701 may determine an intent in the utterance of the user to be 'playing a media content.' The dialog system 701 may suggest (e.g., "Connect BudsPro to TV?") connection switching to the target device 503 for the wireless audio device 601.

Referring to FIG. 10C, the electronic device 501 may determine an utterance of the user (e.g., "Play this video on the TV in the main bedroom" while the user is watching YouTube) to be a device-controlling utterance for the target device 503 (e.g., an utterance for controlling a remote device). The dialog system 701 may determine an intent in the utterance of the user to be mirroring or casting. The dialog system 701 may suggest (e.g., "Okay, the video will be played on the TV in the main bedroom. Switch the connection of BudsPro to the TV?") a connection switching to the target device 503 for the wireless audio device 601.

Figure 11:
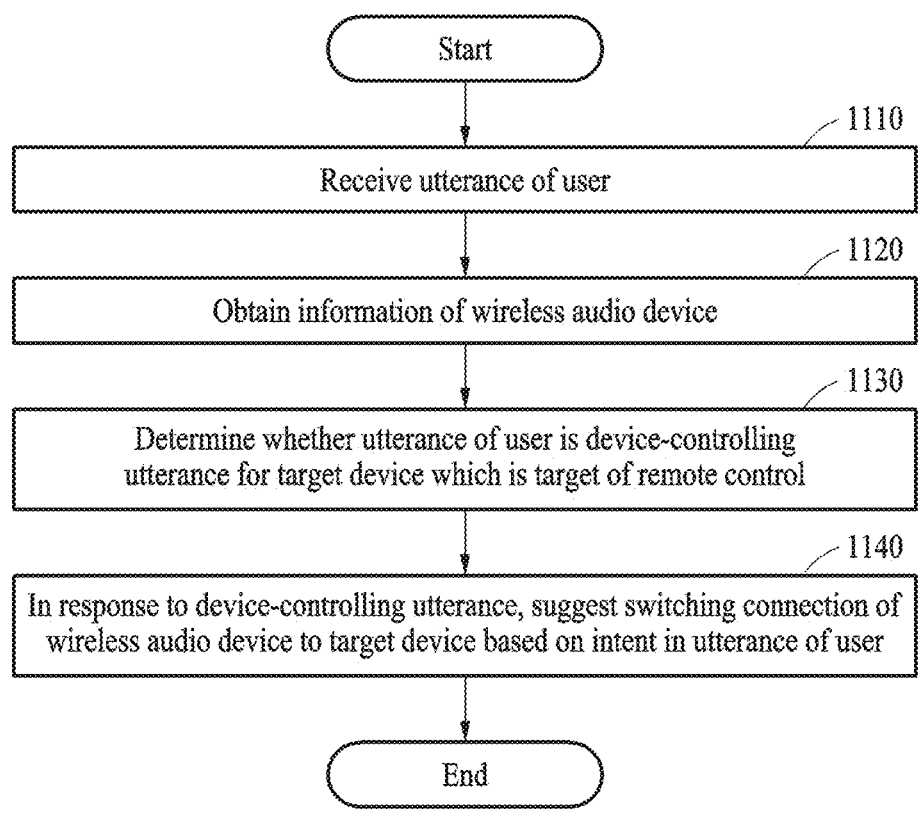
FIG. 11 is a flowchart illustrating an example flow of operations performed by an electronic device according to an embodiment of the disclosure.

FIG. 11 is a flowchart illustrating an example flow of operations performed by an electronic device according to an embodiment of the disclosure.

Operations 1110, 1120, 1130, and 1140 to be described hereinafter with reference to FIG. 11 may be performed by the electronic device 501 to suggest connection switching for the wireless audio device 601 based on an utterance of a user. Operations 1110, 1120, 1130, and 1140 may be performed in sequential order but not be necessarily performed in sequential order. For example, the order of operations 1110, 1120, 1130, and 1140 may be changed, or at least two of the operations may be performed in parallel.

Referring to FIG. 11, in operation 1110, the electronic device 501 may receive an utterance of a user. The utterance of the user may be received through the input module 510 and/or the wireless audio device 601.

In operation 1120, in response to the utterance of the user being received, the electronic device 501 may obtain information (e.g., a connection state, a wearing state, and device type information) of the wireless audio device 601. The electronic device 501 may determine (or verify) the connection state of the electronic device 501 with respect to the wireless audio device 601 and the wearing state of the user with respect to the wireless audio device 601, using the obtained information (e.g., the connection state and the wearing state) of the wireless audio device 601.

In operation 1130, in response to the information (e.g., the determined connection state and wearing state) of the wireless audio device 601, the electronic device 501 may determine whether the utterance of the user is a device-controlling utterance for the target device 503 which is a target of remote control. For example, the electronic device 501 may determine whether the utterance of the user is the device-controlling utterance for the target device 503 based on a preset pattern (e.g., a device-related word or phrase) extracted from a text obtained through a conversion of the utterance of the user. For another example, the electronic device 501 may determine whether the utterance of the user is the device-controlling utterance for the target device 503 based on an intent inferred from the text converted from the utterance of the user.

In operation 1140, in response to the utterance of the user being the device-controlling utterance, the electronic device 501 may suggest switching a connection of the wireless audio device 601 to the target device 503 based on the intent in the utterance of the user. The electronic device 501 may provide the suggestion of such connection switching for the wireless audio device 601 in a visual way or in a voice.

Figure 12:
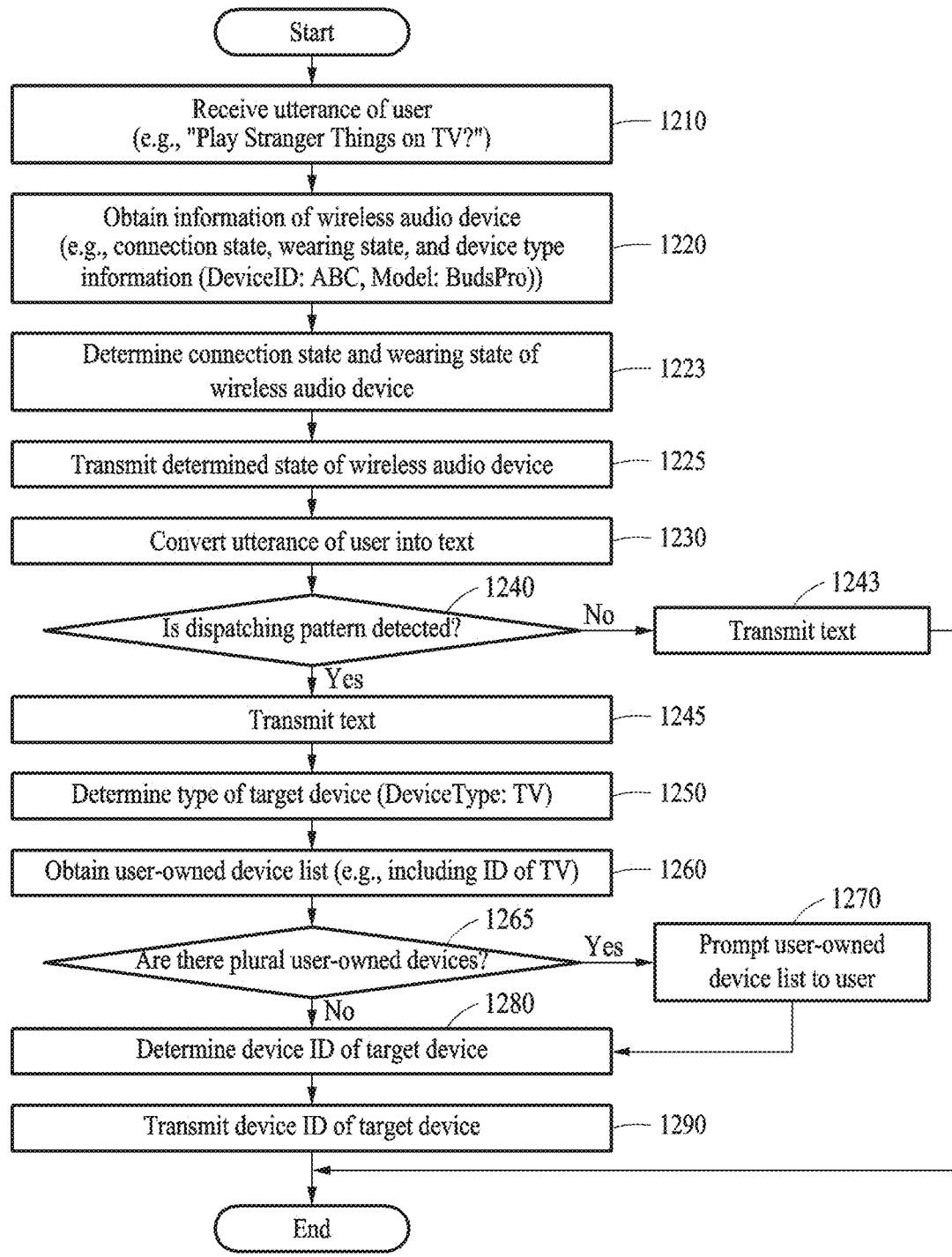
FIG. 12 is a flowchart illustrating an example method of providing connection switching for a wireless audio device based on an utterance of a user according to an embodiment of the disclosure.

FIG. 12 is a flowchart illustrating an example method of providing connection switching for a wireless audio device based on an utterance of a user according to an embodiment of the disclosure.

Operations 1210, 1220, 1223, 1225, 1230, 1240, 1243, 1245, 1250, 1260, 1265, 1270, 1280, and 1290 to be described hereinafter with reference to FIG. 12 may be performed by the electronic device 501 to suggest connection switching for the wireless audio device 601 based on an utterance of a user. Operations 1210, 1220, 1223, 1225, 1230, 1240, 1243, 1245, 1250, 1260, 1265, 1270, 1280, and 1290 may be performed in the ASR module 550, the connection checker 560, the device dispatcher 570, and the device selection module 580 of the electronic device 501. Operations 1210, 1220, 1223, 1225, 1230, 1240, 1243, 1245, 1250, 1260, 1265, 1270, 1280, and 1290 may be performed in sequential order but not be necessarily performed in sequential order. For example, the order of operations 1210, 1220, 1223, 1225, 1230, 1240, 1243, 1245, 1250, 1260, 1265, 1270, 1280, and 1290 may be changed, and at least two of the operations may be performed in parallel.

Referring to FIG. 12, in operation 1210, the electronic device 501 may receive, from a user, an utterance of the user, for example, "Play Stranger Things on TV." The utterance of the user may be received through the input module 510 and/or the wireless audio device 601.

In operation 1220, in response to the utterance of the user being received, the electronic device 501 may obtain information (e.g., a connection state, a wearing state, and device type information) of the wireless audio device 601. The device type information may include, for example, a device ID (e.g., DeviceType=ABC) and a model (e.g., Model=BudsPro).

In operation 1223, the electronic device 501 may determine (or verify) the connection state of the electronic device 501 with respect to the wireless audio device 601 and the wearing state of the user with respect to the wireless audio device 601, using the information (e.g., the connection state and the wearing state) of the wireless audio device 601.

In operation 1225, the electronic device 501 may transmit the determined state (e.g., the determined connection state and wearing state) of the wireless audio device 601 to the dialog system 701.

In operation 1230, the electronic device 501 may convert the utterance of the user into a computer-readable text by performing ASR on the utterance of the user. The electronic device 501 may perform the ASR on the utterance of the user using an acoustic model (AM) and/or a language model (LM).

In operation 1240, the electronic device 501 may determine whether the utterance of the user is the device-controlling utterance for the target device 503 by detecting a preset pattern (e.g., a device-related word and phrase) in the text. For example, when the text converted from the utterance of the user is "Play Stranger Things on TV," the electronic device 501 may determine the utterance to be the device-controlling utterance based on a pattern "on TV." In addition, the electronic device 501 may determine whether the utterance of the user is the device-controlling utterance for the target device 503 by inferring an intent in the text.

In operations 1243 and 1245, the electronic device 501 may transmit the text converted from the utterance of the user to the dialog system 701. However, when the utterance of the user is determined not to be the device-controlling utterance for the target device 503 in operation 1240, the electronic device 501 may not perform operations 1250, 1260, 1265, 1270, 1280, and 1290 subsequent to operation 1240.

In operation 1250, the electronic device 501 may determine a type (e.g., DeviceType=TV) of the target device 503 using the intent inferred from the text.

In operation 1260, the electronic device 501 may obtain a user-owned device list corresponding to the type of the target device 503 from the IoT server 702 using the type of the target device 503. For example, the electronic device 501 may transmit the type of the target device 503 to the IoT server 703. The IoT server 702 may verify user-owned devices (e.g., a TV) corresponding to the type of the target device 503, generate the user-owned device list including device IDs of the user-owned devices (e.g., the TV), and transmit the generated user-owned device list to the electronic device 501. The type of the target device 503 may be determined using the intent inferred from the text.

In operation 1265, the electronic device 501 may determine whether there is a plurality of user-owned devices corresponding to the type of the target device 503 from the user-owned device list.

In operation 1270, when there is a plurality of user-owned devices, the electronic device 501 may prompt the user with the user-owned device list. The user may select the target device 503 which is a target of remote control from the prompted user-owned device list. In contrast, when there is a single user-owned device, operation 1270 may be omitted.

In operation 1280, the electronic device 501 may determine a device ID of the target device 503. For example, when there is a single user-owned device corresponding to the type of the target device 503 in the user-owned device list, the electronic device 501 may determine an ID of the single device to be the device ID of the target device 503. For another example, when there is a plurality of user-owned devices corresponding to the type of the target device 503 in the user-owned device list, the electronic device 501 may determine, to be the device ID of the target device 503, an ID of a device selected by the user from the prompted user-owned device list.

In operation 1290, the electronic device 501 may transmit the ID of the target device 503 to the dialog system 701.

Figure 13:
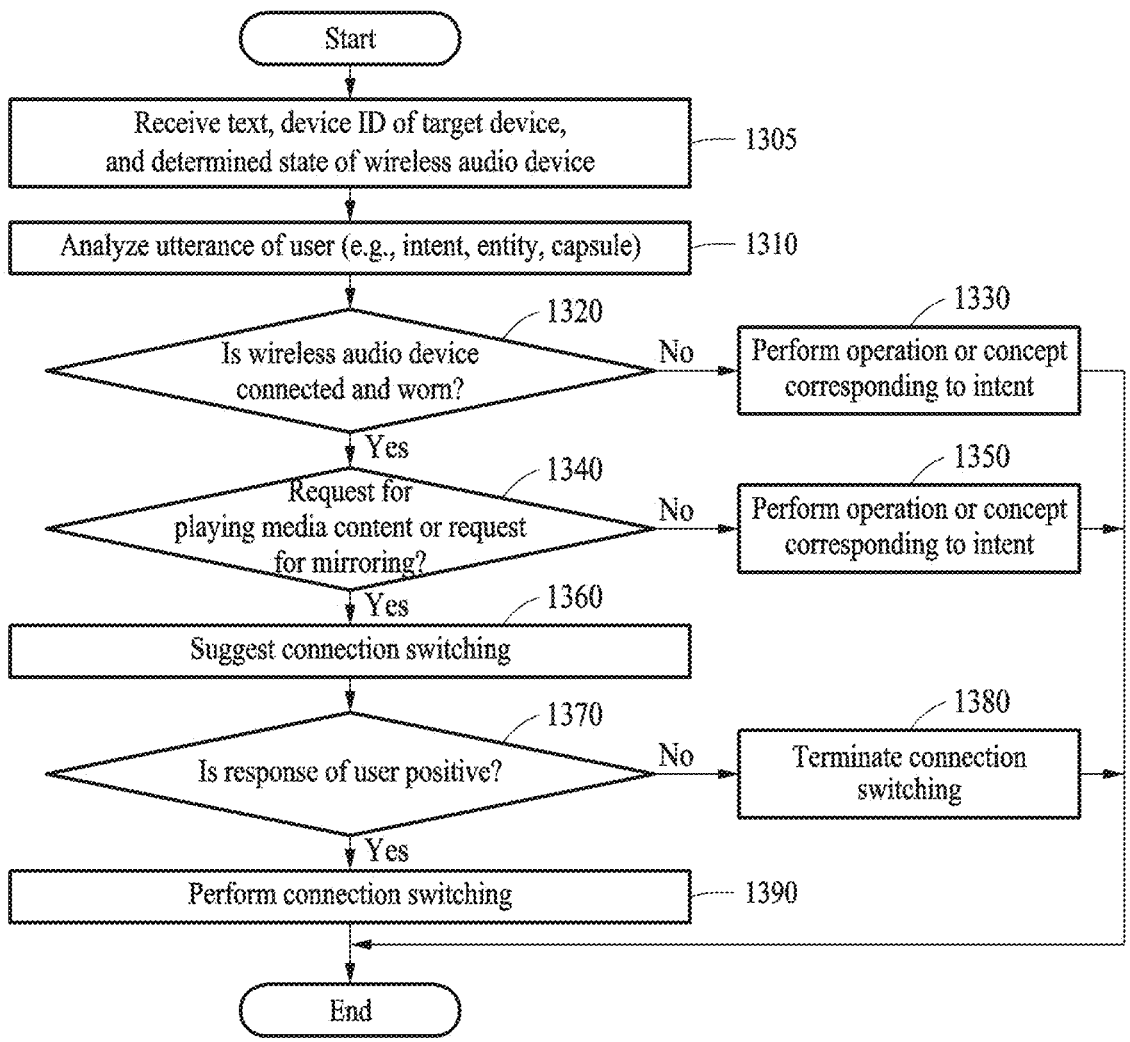
FIG. 13 is a flowchart illustrating another example method of providing connection switching for a wireless audio device based on an utterance of a user according to an embodiment of the disclosure.

FIG. 13 is a flowchart illustrating another example method of providing connection switching for a wireless audio device based on an utterance of a user according to an embodiment of the disclosure.

Operations 1305, 1310, 1320, 1330, 1340, 1350, 1360, 1370, 1380, and 1390 to be described hereinafter with reference to FIG. 13 may be performed to suggest connection switching for the wireless audio device 601 based on an utterance of a user. Operations 1305, 1310, 1320, 1330, 1340, 1350, 1360, 1370, 1380, and 1390 may be performed in the NLU module 730 and the dialog manager 740 of the dialog system 701. Operations 1305, 1310, 1320, 1330, 1340, 1350, 1360, 1370, 1380, and 1390 may be performed in sequential order but not be necessarily performed in sequential order. For example, the order of operations 1305, 1310, 1320, 1330, 1340, 1350, 1360, 1370, 1380, and 1390 may be changed, and at least two of the operations may be performed in parallel.

Referring to FIG. 13, in operation 1305, the dialog system 701 may receive, from the electronic device 501, a text (e.g., a text converted from an utterance of a user), a device ID of the target device 503, a state (e.g., a connection state and a wearing state) determined for the wireless audio device 601.

In operation 1310, the dialog system 701 may determine an intent, entity, and capsule associated with the utterance of the user by analyzing the text.

In operation 1320, the dialog system 701 may verify whether the wireless audio device 601 is connected to the electronic device 501 and/or is worn on the user, using the determined state (e.g., the determined connection state and wearing state) of the wireless audio device 601.

In operation 1330, when at least one of the connection state and the wearing state of the wireless audio device 601 is not verified, the dialog system 701 may perform, on the electronic device 501 and/or the target device 503, an operation or concept corresponding to the analyzed intent based on the verified state (e.g., the connection state or the wearing state).

In operation 1340, when the wireless audio device 601 is connected to the electronic device 501 and is worn on the user, the dialog system 701 may determine whether the analyzed intent corresponds to a request for playing a media content and/or a request for mirroring (or casting).

In operation 1350, when the analyzed intent is not the request for playing a media content and/or the request for mirroring (or casting), the dialog system 701 may perform, on the electronic device 501 and/or the target device 503, an operation or concept corresponding to the analyzed intent.

In operation 1360, when the analyzed intent is the request for playing a media content and/or the request for mirroring (or casting), the dialog system 701 may suggest, to the user (e.g., the electronic device 501), switching a connection (e.g., BT connection switching) of the wireless audio device 601 to the target device 503. The electronic device 501 may provide the suggestion of switching the connection of the wireless audio device 601 to the target device 503 in a visual way or in a voice.

In operation 1370, the dialog system 701 may verify whether a response to the switching of the connection of the wireless audio device 601 received from the user is positive or negative.

In operation 1380, in response to the response being negative, the dialog system 701 may suspend switching the connection (e.g., BT connection switching) of the wireless audio device 601 to the target device 503 and terminate the operation.

In operation 1390, in response to the response being positive (e.g., "Yes, connect"), the dialog manager 740 may perform the connection switching using an ID (e.g., Buds-Device ID) of the wireless audio device 601 transmitted from the first capsule 750 and the ID of the target device 503 transmitted from the device selection module 580.

According to an example embodiment, an electronic device (e.g., the electronic device 501 of FIG. 5) may include a memory (e.g., the memory 530 of FIG. 6) including instructions and a processor (e.g., the at least one processor 520 of FIG. 6) electrically connected and configured to execute the instructions. When the instructions are executed by the processor, the processor may obtain information of a wireless audio device (e.g., the wireless audio device 601 of FIG. 5) wirelessly connectable to the electronic device, determine whether an utterance of a user is a device-controlling utterance for a target device (e.g., the target device 503 of FIG. 5) which is a target of remote control in response to the information of the wireless audio device, and suggest switching a connection of the wireless audio device to the target device based on an intent in the utterance of the user in response to the device-controlling utterance.

In response to the utterance of the user being received, the processor may obtain the information of the wireless audio device.

The intent in the utterance of the user may correspond to a request for playing a media content in the target device or a request for mirroring or casting to the target device during a media content play in the electronic device.

When the wireless audio device is connected to the electronic device and is worn on the user, the processor may determine whether the utterance of the user is the device-controlling utterance.

The processor may provide the suggestion of switching the connection of the wireless audio device to the target device in a visual way or in a voice.

The utterance of the user may be directly received by the wireless audio device or by the electronic device.

The processor may convert the utterance of the user into a text by performing ASR on the utterance of the user, and determine whether the utterance of the user is the device-controlling utterance based on the text.

The processor may determine a type of the target device based on the text.

The processor may select the target device from a user-owned device list corresponding to the type of the target device.

The processor may prompt the user with the user-owned device list.

According to an example embodiment, a method of operating an electronic device (e.g., the electronic device 501 of FIG. 5) may include obtaining information of a wireless audio device (e.g., the wireless audio device 601 of FIG. 5) wirelessly connectable to the electronic device (refer to operation 1120 in FIG. 11), in response to the information of the wireless audio device, determining whether an utterance of a user is a device-controlling utterance for a target device (e.g., the target device 503 of FIG. 5) which is a target of remote control (refer to operation 1130 in FIG. 11), and in response to the device-controlling utterance, suggesting switching a connection of the wireless audio device to the target device based on an intent in the utterance of the user (refer to operation 1140 in FIG. 11).

In response to the utterance of the user being received, the obtaining may include obtaining the information of the wireless audio device.

The intent in the utterance of the user may be a request for playing a media content in the target device or a request for mirroring or casting to the target device during a media content play in the electronic device.

When the wireless audio device is connected to the electronic device and is worn on the user, the determining may include determining whether the utterance of the user is the device-controlling utterance.

The suggesting may include providing the suggestion of switching the connection of the wireless audio device to the target device in a visual way or in a voice.

The utterance of the user may be directly received by the wireless audio device or the electronic device.

The determining may include converting the utterance of the user into a text by performing ASR on the utterance of the user, and determining whether the utterance of the user is the device-controlling utterance based on the text.

The method may further include determining a type of the target device based on the text.

The method may further include selecting the target device from a user-owned device list corresponding to the type of the target device.

The method may further include prompting the user with the user-owned device list.

While the disclosure has been shown and described with reference to various embodiments thereof, it will be understood by those skilled in the art that the various changes in form and details may be made therein without departing from the spirit and scope of the disclosure as defined by the appended claims and their equivalents.

What is claimed is:

1. An electronic device, comprising:
a memory storing one or more computer programs; and
one or more processors communicatively coupled to the memory,
wherein the one or more computer programs include computer-executable instructions that, when executed by the one or more processors individually or collectively, cause the electronic device to:
in response to connecting a wireless audio device to the electronic device while the wireless audio device is worn by a user, monitor user utterances to determine whether a user utterance comprises a device-controlling instruction,
receive the user utterance comprising a first device-controlling instruction for controlling a type of device,
determine whether the user owns a target device of the type of device based on a user-owned device list,
in response to determining that the user owns the target device of the type of device, determine whether the first device-controlling instruction is associated with an audio function, and
in response to determining that the user owns the target device of the type of device, and that the device-controlling instruction is associated with the audio function, suggest a connection switching for the wireless audio device from the electronic device to the target device.

2. The electronic device of claim 1, wherein an intent in the user utterance corresponds to a request for playing media content in the type of device or a request for mirroring or casting to the type of device during the playing of media content in the electronic device.

3. The electronic device of claim 1, further comprising:
a display,
wherein, to suggest the connection switching for the wireless audio device from the electronic device to the target device, the one or more computer programs further include computer-executable instructions that, when executed by the one or more processors individually or collectively, cause the electronic device to provide a visual suggestion through the display or an audio suggestion through the wireless audio device.

4. The electronic device of claim 1, wherein the user utterance is directly received by one of the wireless audio device or the electronic device.

5. The electronic device of claim 1, wherein the one or more computer programs further include computer-executable instructions that, when executed by the one or more processors individually or collectively, cause the electronic device to:
convert the user utterance into text by performing automatic speech recognition (ASR) on the user utterance, and
based on the text, determine whether the user utterance comprises the device-controlling instruction.

6. The electronic device of claim 5, wherein the one or more computer programs further include computer-executable instructions that, when executed by the one or more processors individually or collectively, cause the electronic device to:
based on the text, determine the type of device.

7. The electronic device of claim 6, wherein the one or more computer programs further include computer-executable instructions that, when executed by the one or more processors individually or collectively, cause the electronic device to:
prompt the user to select the target device from a plurality of target devices from the user-owned device list.

8. A method of operating an electronic device, the method comprising:
in response to connecting a wireless audio device to the electronic device while the wireless audio device is worn by a user, monitoring user utterances to determine whether a user utterance comprises a device-controlling instruction;
receiving the user utterance comprising the device-controlling instruction for controlling a type of device;
determining whether the user owns a target device of the type of device based on a user-owned device list;
in response to determining that the user owns the target device of the type of device, determining whether the device-controlling instruction is associated with an audio function; and
in response to determining that the user owns the target device of the type of device, and that the device-controlling instruction is associated with the audio function, suggesting a connection switching for the wireless audio device from the electronic device to the target device.

9. The method of claim 8, wherein an intent in the user utterance corresponds to a request for playing media content in the type of device or a request for mirroring or casting to the type of device during the playing of media content in the electronic device.

10. The method of claim 8, wherein the suggesting comprises:
providing a visual suggestion through a display of the electronic device or an audio suggestion through the wireless audio device.

11. The method of claim 8, wherein the user utterance is directly received by one of the wireless audio device or the electronic device.

12. The method of claim 8, wherein the determining comprises:
converting the user utterance into a text by performing automatic speech recognition (ASR) on the user utterance; and
based on the text, determining whether the user utterance comprises the device-controlling instruction.

13. The method of claim 12, further comprising:
based on the text, determining the type of the target-device.

14. The method of claim 13, further comprising:
prompting the user to select the target device from a plurality of target devices from the user-owned device list.

* * * * *